(12) United States Patent
Tomiyasu et al.

(10) Patent No.: US 8,693,040 B2
(45) Date of Patent: Apr. 8, 2014

(54) IMAGE PROCESSING SYSTEM, IMAGE PROCESSING SERVER, AND IMAGE FORMING APPARATUS

(75) Inventors: Kazuhiro Tomiyasu, Toyokawa (JP); Shoko Haba, Toyokawa (JP); Masao Hosono, Toyokawa (JP); Taketoshi Yamahata, Toyokawa (JP); Eiichi Yoshida, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 138 days.

(21) Appl. No.: 13/468,554

(22) Filed: May 10, 2012

(65) Prior Publication Data

US 2012/0287469 A1 Nov. 15, 2012

(30) Foreign Application Priority Data

May 10, 2011 (JP) .................................. 2011-105754

(51) Int. Cl.
*G06F 15/00* (2006.01)

(52) U.S. Cl.
USPC ......................................................... 358/1.15

(58) Field of Classification Search
USPC ......................................................... 358/1.15
See application file for complete search history.

(56) References Cited

U.S. PATENT DOCUMENTS

| 2002/0051164 A1 * | 5/2002 | Watanabe et al. ............. 358/1.13 |
| 2005/0206917 A1 | 9/2005 | Ferlitsch |

FOREIGN PATENT DOCUMENTS

| JP | 05-167765 A | 7/1993 |
| JP | 2004-289500 A | 10/2004 |
| JP | 2006-195893 A | 7/2006 |
| JP | 2006-319974 A | 11/2006 |

OTHER PUBLICATIONS

Office Action (Notification of Allowance) issued on Jun. 18, 2013, by the Japanese Patent Office in corresponding Japanese Patent Application No. 2011-105754, and an English Translation of the Office Action. (6 pages).

* cited by examiner

*Primary Examiner* — Saeid Ebrahimi Dehkordy
(74) *Attorney, Agent, or Firm* — Buchanan Ingersoll & Rooney PC

(57) ABSTRACT

An image processing system comprises an image forming apparatus and a plurality of image processing servers. An image processing server transmits a test image to a plurality of image processing servers in charge of a former image processing operation, collects test results from all of them, and selects one of the image processing servers having returned the test results which are judged as being equal to or higher than a standard value, as the most preferred server, while an image forming apparatus transmits a test image to a plurality of image processing servers in charge of a final image processing operation, collects test results from all of them, and selects one of the image processing servers having returned the test results of the final image processing operation which are judged as being equal to or higher than a standard value, as the most preferred server.

14 Claims, 26 Drawing Sheets

Service Information

| Order of Service | Document Image Transfer Port | Information Communication Port | Name of Service | Reference Item | Charge per Unit | Standard Value | Ability Checking Method |
|---|---|---|---|---|---|---|---|
| 1 | http://www.server1a.or.jp/image/ | http://www.server1a.or.jp/com/ | Blank Page Removal | Number of Target Sides of Sheet | 10yen | 0.01% | |
| 1 | http://www.server1b.or.jp/image/ | http://www.server1b.or.jp/com/ | Blank Page Removal | Number of Target Sides of Sheet | 20yen | 0.01% | |
| 1 | http://www.server1c.or.jp/image/ | http://www.server1c.or.jp/com/ | Blank Page Removal | Number of Target Sides of Sheet | 30yen | 0.01% | |
| 2 | http://www.server2a.or.jp/image/ | http://www.server2a.or.jp/com/ | OCR | Number of Characters Detected | 6yen | 99% | |
| 2 | http://www.sever2b.or.jp/image/ | http://www.server2b.or.jp/com/ | OCR | Number of Target Sides of Sheet | 50yen | 99% | |
| 2 | http://www.server2c.or.jp/image/ | http://www.server2c.or.jp/com/ | OCR | Number of Target Sides of Sheet | 60yen | 99% | |
| 3 | http://www.server3a.or.jp/image/ | http://www.server3a.or.jp/com/ | Translation | Number of Characters | 70yen | | |
| 3 | http://www.server3b.or.jp/image/ | http://www.server3b.or.jp/com/ | Translation | Number of Characters | 80yen | | |
| 3 | http://www.server3c.or.jp/image/ | http://www.server3c.or.jp/com/ | Translation | Number of Characters | 90yen | | |

FIG.8

Most Preferred Server Information

| Service | Most Prefererd Server | Charge |
|---|---|---|
| Service 1 | — | — |
| Service 2 | — | — |
| Service 3 | — | — |

FIG.9

Estimation Reference Information

| Available Servers | Reference Item | Determined Value |
|---|---|---|
| Server 21a | Number of Target Sides of Sheet | 20 |
| Server 21b | Number of Target Sides of Sheet | 20 |
| Server 21c | Number of Target Sides of Sheet | 20 |

FIG.10

| | Number of Target Sides of Sheet | Charge per Unit |
|---|---|---|
| Server 21a | 15 | 10yen |
| Server 21b | 17 | 20yen |
| Server 21c | 19 | 30yen |

Estiamtion Reference Information

| Available Server | Reference Item | Determined Value |
|---|---|---|
| Server 22a | Number of Characters Detected | — |
| Server 22b | Number of Target Sides of Sheet | 15 |
| Server 22c | Number of Target Sides of Sheet | 15 |

FIG.12b

Estiamtion Reference Information

| Available Server | Reference Item | Determined Value |
|---|---|---|
| Server 22a | Number of Characters Detected | — |
| Server 22b | Number of Target Sides of Sheet | 17 |
| Server 22c | Number of Target Sides of Sheet | 17 |

FIG.12c

Estiamtion Reference Information

| Available Server | Reference Item | Determined Value |
|---|---|---|
| Server 22a | Number of Characters Detected | — |
| Server 22b | Number of Target Sides of Sheet | 19 |
| Server 22c | Number of Target Sides of Sheet | 19 |

FIG.13a

| Available Server | Charge | Test Results |
|---|---|---|
| Server 21a | 400yen | OK |
| Server 21b | 200yen | NG |
| Server 21c | 600yen | OK |

Most Preferred Server Information

FIG.13b

| Service | Most Preferred Server | Charge |
|---|---|---|
| Service 1 | Server 21a | 400yen |
| Service 2 | — | — |
| Service 3 | — | — |

| Available Server | Number of Characters Detected |
|---|---|
| Server 22a | 100 |
| Server 22b | 110 |
| Server 22c | 90 |

Estiamtion Reference Information

| Available Server | Reference Item | Determined Value |
|---|---|---|
| Server 23a | Number of Characters | 100 |
| Server 23b | Number of Characters | 100 |
| Server 23c | Number of Characters | 100 |

FIG.15b

Estiamtion Reference Information

| Available Server | Reference Item | Determined Value |
|---|---|---|
| Server 23a | Number of Characters | 110 |
| Server 23b | Number of Characters | 110 |
| Server 23c | Number of Characters | 110 |

FIG.15c

Estiamtion Reference Information

| Available Server | Reference Item | Determined Value |
|---|---|---|
| Server 23a | Number of Characters | 90 |
| Server 23b | Number of Characters | 90 |
| Server 23c | Number of Characters | 90 |

FIG.16a

| Available Server | Charge | Test Results |
|---|---|---|
| Server 22a | 600yen | NG |
| Server 22b | 750yen | OK |
| Server 22c | 900yen | OK |

Most Preferred Server Information

FIG.16b

| Service | Available Server | Charge |
|---|---|---|
| Service 1 | Server 21a | 200yen |
| Service 2 | Server 22b | 750yen |
| Service 3 | — | — |

FIG.17a

| Available Server | Charge | Test Results |
|---|---|---|
| Server 23a | 7700yen | OK |
| Server 23b | 8800yen | NG |
| Server 23c | 9900yen | OK |

Most Preferred Server Information

FIG.17b

| Service | Available Server | Charge |
|---|---|---|
| Service 1 | Server 21a | 200yen |
| Service 2 | Server 22b | 750yen |
| Service 3 | Server 23a | 7700yen |

# IMAGE PROCESSING SYSTEM, IMAGE PROCESSING SERVER, AND IMAGE FORMING APPARATUS

This application claims priority under 35 U.S.C. §119 to Japanese Patent Application No. 2011-105754 filed on May 10, 2011, the entire disclosure of which is incorporated herein by reference in its entirety.

BACKGROUND OF THE INVENTION

1. Field of the Invention

The present invention relates to: an image processing system with a plurality of image processing servers and an image forming apparatus such as a multifunctional digital machine referred to as MFP, being connected to each other via a network; an image processing server to be employed in the image processing system; and an image forming apparatus also to be employed in the image processing system.

2. Description of the Related Art

The following description sets forth the inventor's knowledge of related art and problems therein and should not be construed as an admission of knowledge in the prior art.

As well as an image forming apparatus such as a MFP, performing by itself all image processing operations on image data received as mentioned above, there is an image processing system making a plurality of external image processing servers cooperatively perform different image processing operations in an orderly manner, which has been heretofore suggested (for example, Japanese Unexamined Patent Publications No. 2004-289500 and No. 2006-195893).

In such an image processing system making a plurality of image processing servers cooperatively perform different image processing operations, an image forming apparatus whose resources are too limited to perform all image processing operations does not need to have a complex configuration such as having the ability of performing all image processing operations, which is very advantageous.

Recently, there is an image processing system just like SaaS (Software as a Service), providing Web services to allow users to select preferred image processing operations of various suppliers to obtain target images.

Japanese Unexamined Patent Publication No. 2004-289500 discloses a method for an image processing apparatus, including: generating document data; and instructing a plurality of external servers to cooperatively perform specific operations exceeding the ability of the image processing apparatus, on the document data.

Japanese Unexamined Patent Publication No. 2006-195893 discloses a method of performing a scanning operation while calculating charges for all the services provided by a job flow service apparatus, a multifunctional machine, an image processing apparatus, a converter, and a file administration apparatus, in this order.

In such an image processing system as mentioned above, there may be multiple image processing servers performing similar image processing services and there may be other multiple image processing servers each being in charge of one of the image processing services. In this case, there are considered to be a lot of combinations of image processing servers, which can be composed by users. However, users would not be always able to receive services with very good quality, depending on the combination.

When placing an order of OCR and translation services for example, a cost-sensitive user would compose a combination of image processing servers by selecting image processing servers offering their services for the lowest charges. Thus the OCR server selected by this user would not be always very good in terms of the quality of service. And translation servers possibly can have a problem of compatibility with the OCR servers because of their different characteristics. Therefore, the user would not be always able to receive OCR and translation services in total, with very good quality.

Compatibility between servers is substantially a factor which never affects the quality of services regardless of the data to be processed by the services. However, composing a combination of servers possibly causes them perform unnecessary operations. In recent years, from the perspective of security control, more people have come to use a character encoding service to encode characters on a hard copy document, resulting in an increasing demand for an image processing system which offers services with very good quality.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an image processing system comprising:
  an image forming apparatus being configured to output a target image; and
  a plurality of image processing servers being connected to the image forming apparatus via a network and configured to perform one of sequential image processing operations on the target image outputted from the image forming apparatus,
  wherein there are a plurality of the plurality of image processing servers, being configured to cooperatively and orderly perform the sequential image processing operations on the target image outputted from the image forming apparatus,
  the image processing server comprising:
  a test image transmitter which transmits a test image to all the image processing servers in charge of a former image processing operation;
  an image processor which performs a current image processing operation on a test image;
  a test results obtainer which obtains the results of the former image processing operation performed on the test image, from all those in charge of the former image processing operation;
  a judgment portion which judges whether or not the results of the former image processing operation are equal to or higher than a standard value;
  a server selector which selects a most preferred server among the image processing servers only having returned the results which are judged as being equal to or higher than the standard value; and
  a notice transmitter which transmits a notice of the most preferred server selected by the server selector, to all those in charge of a next image processing operation or the image forming apparatus,
  the image forming apparatus comprising:
  a test image storage which stores a test image;
  a test image transmitter which transmits the test image stored on the test image storage, to all the image processing servers in charge of a final image processing operation;

a test results obtainer which obtains the results of the final image processing operation performed on the test image, from all those in charge of the final image processing operation;

a judgment portion which judges whether or not the results of the final image processing operation are equal to or higher than a standard value; and a server selector which selects a most preferred server among the image processing servers only having returned the results of the final image processing operation which are judged as being equal to or higher than the standard value.

A second aspect of the present invention relates to an image processing system comprising:

an image forming apparatus being configured to output a target image; and a plurality of image processing servers being connected to the image forming apparatus via a network and configured to perform one of sequential image processing operations on the target image outputted from the image forming apparatus, wherein there are a plurality of the plurality of image processing servers, being configured to cooperatively and orderly perform the sequential image processing operations on the target image outputted from the image forming apparatus, the image processing servers each comprising:

an image processor which performs the image processing operation on a test image received from the image forming apparatus; and a test results transmitter which transmits the results of the image processing operation performed on the test image by the image processor, to the image forming apparatus, the image forming apparatus comprising:

a test image storage which stores a test image;

a test image transmitter which transmits the test image stored on the test image Storage, to all the image processing servers;

a test results obtainer which obtains the results of the image processing operation performed on the test image, from all the image processing servers;

a judgment portion which judges whether or not the results of the image processing operation are equal to or higher than a standard value; and a server selector which selects a most preferred server among the image processing servers only having returned the results which are judged as being equal to or higher than the standard value.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 8 is a view illustrating one example of a table of service information;

FIG. 9 is a view illustrating a table of most preferred server information;

FIG. 10 is a view illustrating a table of estimation reference information;

FIG. 11 is a table containing the numbers of the target sides of sheets obtained by the image processing servers in charge of the image processing service 1 which is removing blank pages;

FIGS. 12a, 12b, and 12c are tables of estimation reference information which are transferred from the image processing servers in charge of the image processing service 1 to the image processing servers in charge of the image processing service 2;

FIG. 13a is a table of charge information of all image processing servers in charge of the image processing service 1; and 13b is a table of most preferred server information;

FIG. 14 is a table of the numbers of characters obtained by the image processing servers in charge of the second-order image processing service which is character recognition;

FIGS. 15a, 15b, and 15c are tables of estimation reference information which are transferred from the image processing servers in charge of the image processing service 1 to the image processing servers in charge of the image processing service 3;

FIG. 16a is a table of charge information of all image processing servers in charge of the image processing service 2; FIG. 16b is a table of most preferred server information;

FIG. 17a is a table of charge information of all image processing servers in charge of the final image processing service (image processing service 3); and 17b is a table of most preferred server information;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one mode of implementing the present invention will be described with reference to the accompanying drawings.

Figure 1:
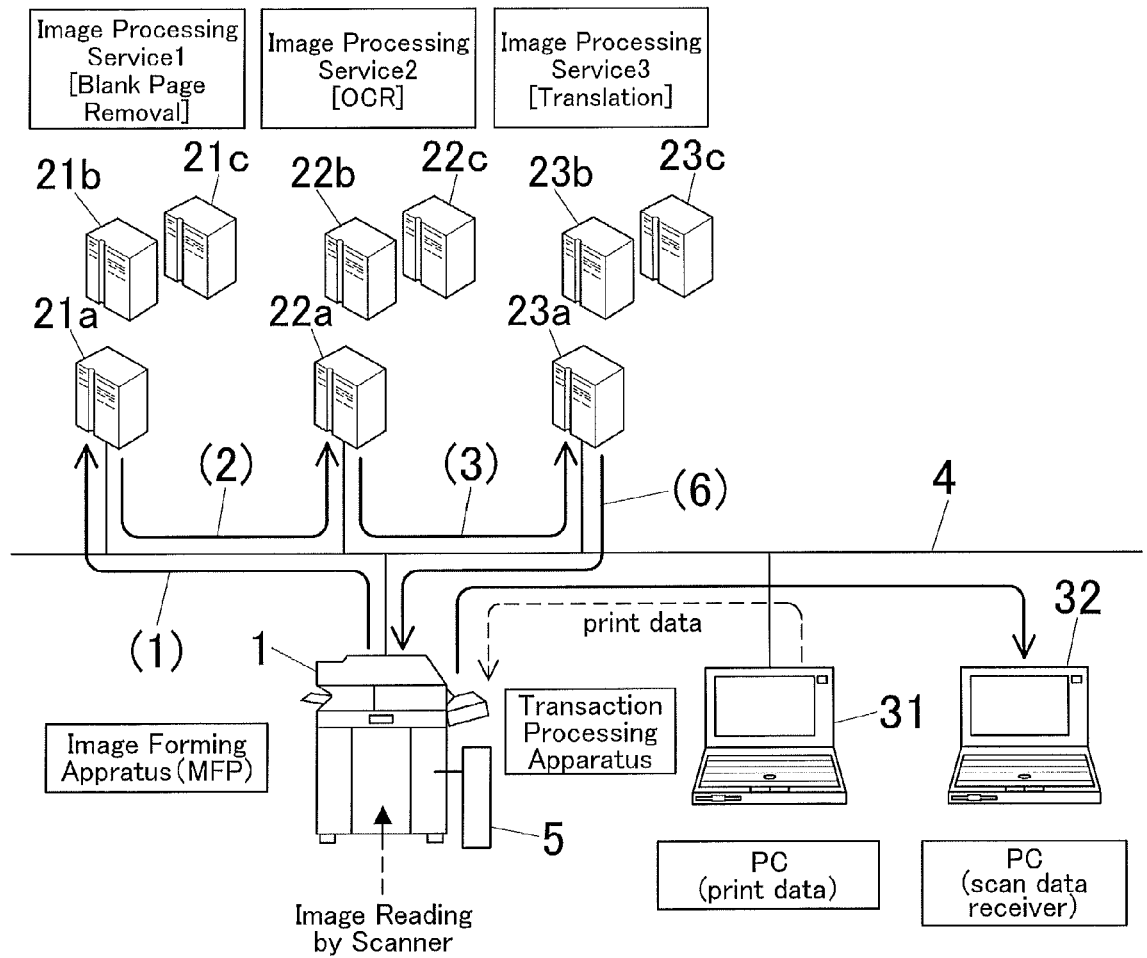
FIG. 1 is a view illustrating a configuration of an image processing system according to one mode of implementing the present invention.

FIG. 1 is a view illustrating a configuration of an image processing system according to one mode of implementing the present invention.

The image processing system is provided with: an image forming apparatus 1; multiple image processing servers (nine servers in this mode of implementation) 21a-21c, 22a-22c, 23a-23c, every three of which belong to one image processing group (this means three groups in this mode of implementation); and multiple terminals (two terminals in this mode of implementation) 31 and 32 each of which is composed of a personal computer owned by a user, all of which are connected to each other via a network 4, wherein a transaction processing apparatus 5 is further connected to the image forming apparatus 1.

According to this mode of implementation, these nine image processing servers in the three image processing groups are configured to perform their responsible image processing services on image data read out from a document by the image forming apparatus 1 or print data received from the terminals 31 and 32, in a predetermined order.

More specifically, the three image processing servers 21a-21c in charge of an image processing service 1 are configured to remove blank pages in the target image data. A charge for this service should be estimated based on the number of the target sides of sheets. That is, the reference item is the number of the target sides of sheets and the reference value is the total number of the target sides of sheets in the target image data. Hereinafter, the target image data also will be referred to as 'document image'.

The three image processing servers 22a-22c in charge of an image processing service 2 is configured to perform character recognition (OCR) on the document image obtained after removing blank pages. In other words, the image processing servers 22a-22c extract text from the obtained document image and recognize individual characters therein. A charge for this service should be estimated based on the number of characters recognized by the image processing server 22a. That is, the reference item is the number of characters and the reference value is the total number of characters in the target document image. As for the image processing servers 22b and 22c, a charge for this service should be estimated based on the number of the target sides of sheets in the target document image. That is, the reference item is the number of the target sides of sheets and the reference value is the total number of the target sides of sheets in the target document image.

The three image processing servers 23a-23c in charge of an image processing service 3 is configured to perform translation on the document image obtained after removing blank pages then recognizing characters. A charge for this service should be estimated based on the number of characters. That is, the reference item is the number of characters and the reference value is the total number of characters in the target document image.

In this mode of implementation, all the image processing servers 21a-21c, 22a-22c, 23a-23c are configured to perform their responsible image processing services. Furthermore, the image processing servers 22a-22c in charge of the image processing service 2 are configured to select a most preferred server among the image processing servers 21a-21c in charge of the image processing service 1 and transmit a notice of the most preferred server to the image processing servers 23a-23c in charge of the image processing service 3.

The image processing servers 23a-23c in charge of the image processing service 3 are configured to select a most preferred server among the image processing servers 22a-22c in charge of the image processing service 2 and transmit a notice of the most preferred server to the image forming apparatus 1.

The image forming apparatus 1 is configured to select a most preferred server among the image processing servers 23a-23c in charge of the image processing service 3 which is the final one.

More specifically, the image processing servers 22a-22c transmit a test image (also referred to as 'test pattern') to all the image processing service 21a-21c, collect the results (also referred to as 'test results') of the image processing service 1 from all the image processing servers 21a-21c, and select a most preferred server among the image processing servers only having returned the test results which are judged as being equal to or higher than a certain standard value i.e. among the image processing servers only having proved a certain level of the quality of service by the test results. The image forming apparatus 1 transmits a test pattern to all the image processing servers 23a-23c, collect the test results of the final image processing service from all the image processing servers 23a-23c, and select one of the image processing servers only having returned the test results which are judged as being equal to or higher than a certain standard value.

In this way as mentioned above, the image processing system is configured to select a most preferred server among those in charge of the image processing service 1, among those in charge of the image processing service 2, and among those in charge of the image processing service 3, respectively. This operation will be later described in detail.

The image forming apparatus 1 is an originator of a document image, which makes the image processing servers 21a-21c, 22a-22c, 23a-23c perform their image processing services by outputting a document image to them. In this mode of implementation, the image forming apparatus 1, as which a MFP, a multifunctional digital machine is employed, has a copier function, a scanner function, a facsimile (also referred to as FAX) function, a printer function, a memory function, and the like.

Figure 2:
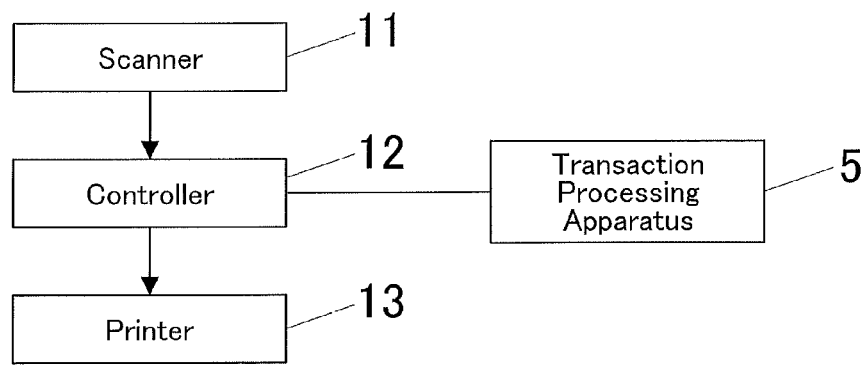
FIG. 2 is a block diagram illustrating a configuration of an image forming apparatus employed in the image processing system of FIG. 1.

FIG. 2 is a block diagram illustrating a configuration of the image forming apparatus 1.

The image forming apparatus 1 is provided with: a scanner 11 for reading an image of a document and converting it to image data which is electronic data; a controller 12 for performing operations on the image data obtained by the scanner 11 and transmitting it to a printer 13; and a printer 13 for printing out on paper the image data received from the controller 12.

Figure 3:
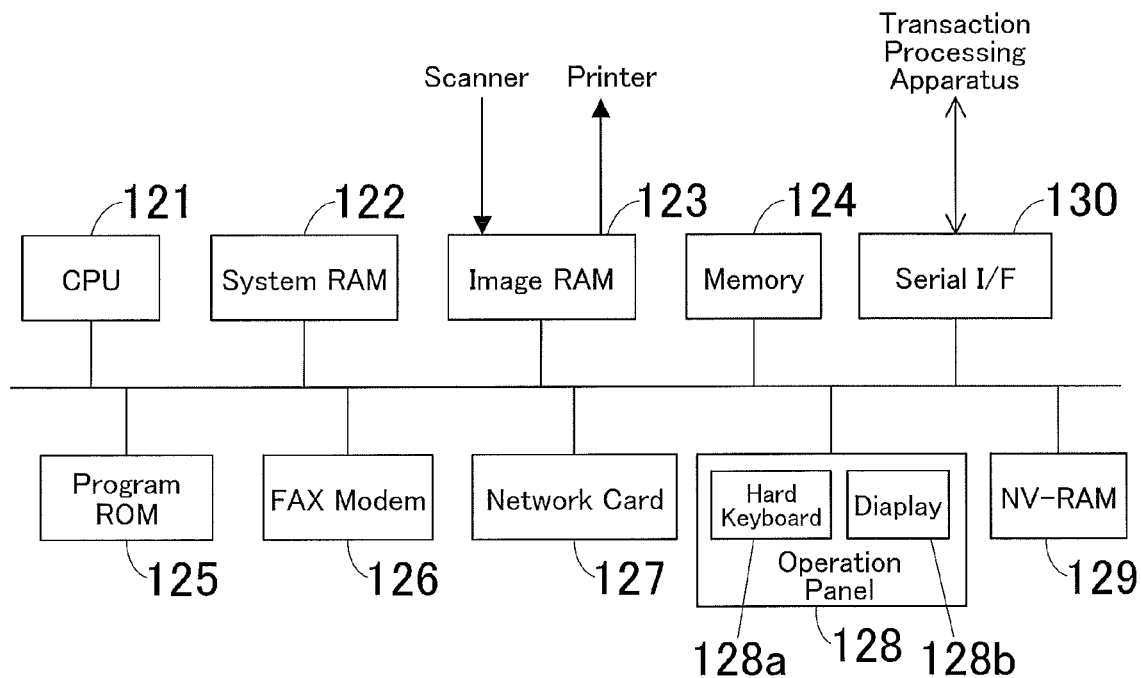
FIG. 3 is a block diagram illustrating a controller of the image forming apparatus in detail.

FIG. 3 is a block diagram illustrating the controller 12 in detail.

The controller 12 is provided with: a CPU 121, a system RAM 122, an image RAM 123, a memory 124, a program ROM 125, a FAX modem 126, a network card 127, an operation panel 128, a NV-RAM 129, a serial interface (serial I/F) 130, and the like.

The CPU 121 integrally controls the entire image forming apparatus 1 by executing various functions of the image forming apparatus 1 such as copying, printing, FAX transmission and reception, and the like. Specifically, in this mode of implementation, the CPU 121 further performs the following control operations. The control operations of the CPU 121 includes: generating various types of information necessary for selecting the most preferred server, such as service information indicating the order of multiple image processing services specified by the user and estimation reference information based on which charges for the multiple image processing services are calculated (both of which will be later described); and transmitting the generated information objects and a target document image to the image processing servers 21a-21c in charge of the first image processing service.

The system RAM 122 cumulatively stores necessary data for the CPU 121 to execute operation programs and temporarily keeps a memory area while the operation programs are active.

The image RAM 123 is a memory which temporarily stores image data received from the scanner 11 or the like.

The memory 124, which is comprised of a hard disk drive (HDD), for example, stores image data received from the scanner 11, application programs, and other data. Specifically, in this mode of implementation, the memory 124 further stores and registers on itself details of available image processing services obtained from the image processing servers 21a-21c, 22a-22c, 23a-23c.

The program ROM 125 is a memory which stores operation programs for the CPU 121. The program ROM 125 further stores programs to control the display and the key input on the operation panel 128, graphic data to display keys on a display 128b of the operation panel 128, 'key management information' defining how to react with key presses.

The FAX modem 126 is a device which transmits and receives facsimiles; the network card 127 serves as a communicator which performs communication with the image processing servers 21a-21c, 22a-22c, 23a-23c and external devices such as the terminals 31 and 32, via the network 4. In this mode of implementation, service information, document images, and the like are exchanged over HTTP among the image processing servers 21a-21c, 22a-22c, 23a-23c, and also between the image forming apparatus 1 and the image processing servers 21a-21c, 22a-22c, 23a-23c.

The operation panel 128 allows users to operate the image forming apparatus 1. The operation panel 128 is provided with: a hard keyboard 128a including a Start key, a Stop key, a numeric keypad, and the like; and a display 128b which is a liquid crystal display with touch-panel functionality, displaying messages, operation status, and soft keys for users.

The NV-RAM 129 is a memory which stores nonvolatile information specified by users, test patterns, and the like.

The serial I/F 130 is an interface which transmits and receives charging information to and from a transaction processing apparatus 5.

The transaction processing apparatus 5 processes a transaction for an image processing service. In other words, the image forming apparatus 1 calculates the sum of the charges for the image processing services of the image processing servers 21a-21c, 22a-22c, 23a-23c, and displays the calculated amount on the display 128b of the operation panel 128. When the user inputs as much money as displayed thereon into the transaction processing apparatus 5, the transaction processing apparatus 5 starts processing a transaction for his/her specified services.

When a copier function is executed on the image forming apparatus 1, image data obtained by the scanner 11 is temporarily stored on the image RAM 123. And then the image data is transmitted to the printer 13 to be printed out.

When a scanner function is executed on the image forming apparatus 1, image data obtained by the scanner 11 is temporarily stored on the image RAM 123. And the image data is read out by the CPU 121 to be encoded to an all-purpose image form. And then the image data can be externally transmitted over e-mail or FTP from the network card 127.

When a FAX transmitting function is executed on the image forming apparatus 1, image data obtained by the scanner 11 is temporarily stored on the image RAM 123. And the image data is converted to a suitable resolution and a compressed form by the CPU 121 so as to be transmitted by FAX, then externally transmitted via the FAX modem 126.

When a FAX receiving function is executed on the image forming apparatus 1, image data received via the FAX modem 126 is temporarily stored on the image RAM 123. And the image data is converted to a suitable form by the CPU 121, then transmitted to the printer 13 to be printed out.

When a printer function is executed on the image forming apparatus 1, a page description language is developed in the image RAM 123 by the CPU 121, then transmitted to the printer 13 to be printed out.

The page description language may be stored on the memory 124 so as to be later printed out as many times as needed. When the user gives an instruction to store image data for a long time, image data temporarily stored on the image RAM 123 is transferred to the memory 124 to be stored thereon.

The operations of the image forming apparatus 1 as described above, for example reading out image data and printing out print data, will not be further described in detail because they are well-known technologies of an image forming apparatus.

Figure 4:
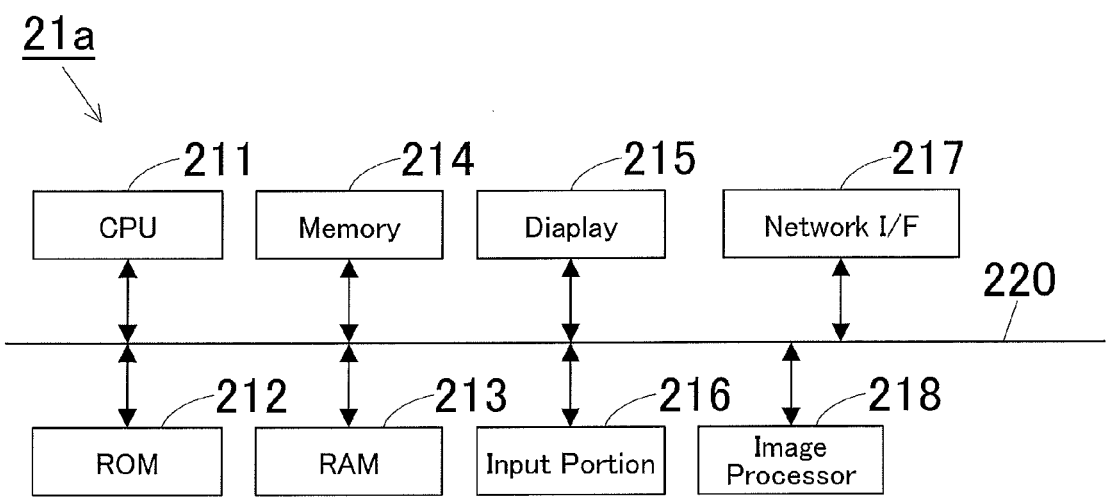
FIG. 4 is a block diagram illustrating a configuration of an image processing server.

FIG. 4 is a block diagram illustrating a configuration of the image processing servers 21a-21c, 22a-22c, 23a-23c. Here, a configuration of the image processing server 21a will be described in detail while a description of the other image processing servers 21b, 21c, 22a-22c, 23a-23c will be omitted, because the image processing servers 21a-21c, 22a-22c, 23a-23c have a common configuration.

An all-purpose computer constitutes the image processing server 21a; as illustrated in FIG. 4, the image processing server 21a is provided with: a CPU 211; a ROM 212; a RAM 213; a memory 214; a display 215; an input portion 216; a network interface (network I/F) 217; an image processor 218; and the like, all of which are connected to each other via a system bus 220.

The CPU 211 integrally controls the entire image processing server 21a by executing operation programs stored on a recording medium such as the ROM 212. By the control of the CPU 211, specifically, in this mode of implementation, an image processing operation is performed by the image processor 218 on a document image received from the image forming apparatus 1 or one of the image processing servers in charge of the last image processing operation, and the image data obtained by the image processing operation is transmitted to one of the image processing servers in charge of the next image processing operation. An image processing operation is also performed by the image processor 218 on a test pattern received from the image forming apparatus 1 or one of the image processing servers in charge of the next image processing operation, and the test results are returned thereto. Meanwhile, a test pattern is transmitted to all the image processing servers in charge of the last image processing operation, the test results are collected therefrom, and it is judged which image processing servers caused the test results which are judged as being equal to or higher than a standard value. Furthermore, by the control of the CPU 211, a value for the reference item based on which the present image processing server will calculate its charge or the image processing servers in charge of the next image processing operation will calculate their charges is determined based on the document image, and one of the image processing servers having returned the test results which are judged as being equal to or higher than the standard value is selected as the most preferred server. The control of the CPU 211 will be later described in detail.

The ROM 212 is a recording medium which stores programs and other data for the CPU 211 to execute processing.

The ROM 213 is a recording medium which provides a work area for the CPU 211 to execute processing according to an operation program.

A hard disk drive, for example, constitutes the memory 214; the memory 214 stores application programs and other various types of data. In this mode of implementation, the memory 214 further stores a test pattern for the image processing servers in charge of the last image processing operation to perform a test operation.

A CRT display or a liquid-crystal display constitutes the display 215; the display 215 displays various messages, entry accepting screens, selection screens, and other screens for users.

The entry portion 216, which serves users to perform input operations, is provided with a keyboard, a mouse, and the like.

The network interface 217 serves as a communicator which transmits and receives data with the image forming apparatus 1, the image processing servers 21b, 21c, 22a-22c, 23a-23c, the terminals 31-32, and other external devices, via the network 4.

The image processor 218 performs a predetermined image processing operation on target image data under control of the CPU 211.

The following is the overview of the operations of the image processing system of FIG. 1.

To start with, the image forming apparatus 1 obtains the available image processing services of the image processing servers 21a-21c, 22a-22c, 23a-23c by sending out requests to all of them over HTTP, then registers on itself.

Figure 5:
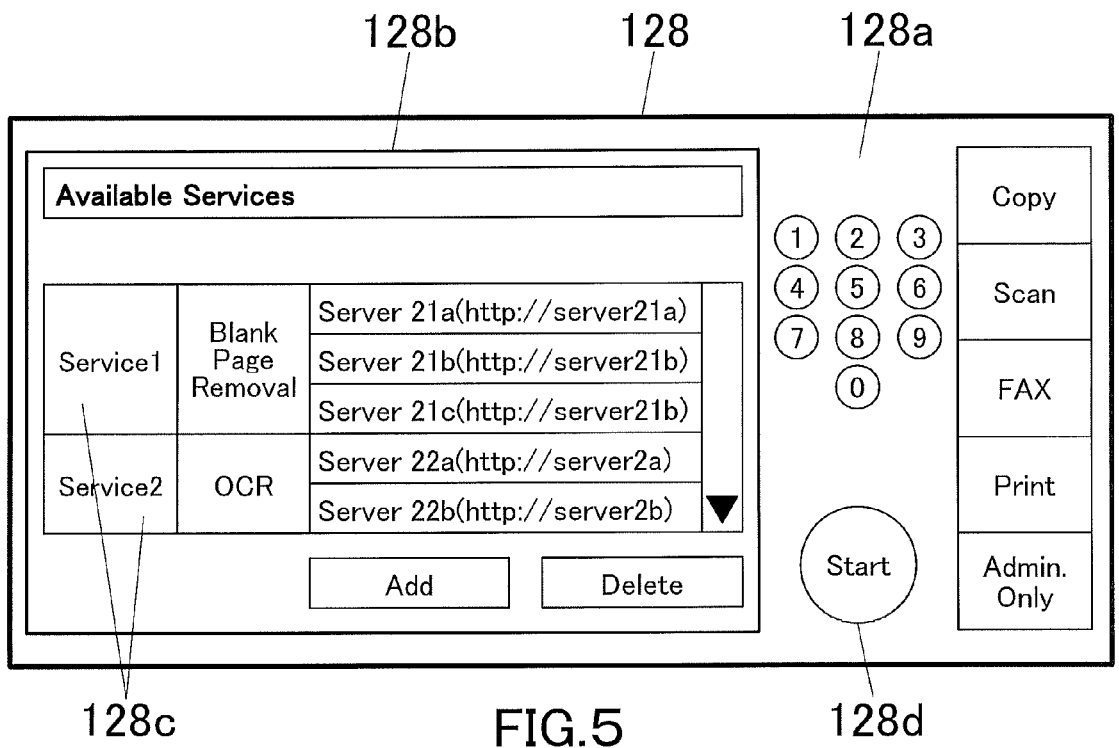
FIG. 5 is a two-dimensional view illustrating an operation panel which displays keys for selecting image processing services.

When the available image processing services are successfully registered on the image forming apparatus 1, keys 128c for selecting image processing services appear on the display 128b of the operation panel 128, as illustrated in FIG. 5. The locations of the image processing servers 21a-21c, 22a-22c, 23a-23c in charge of the respective image processing services are displayed thereon as well.

Figure 6:
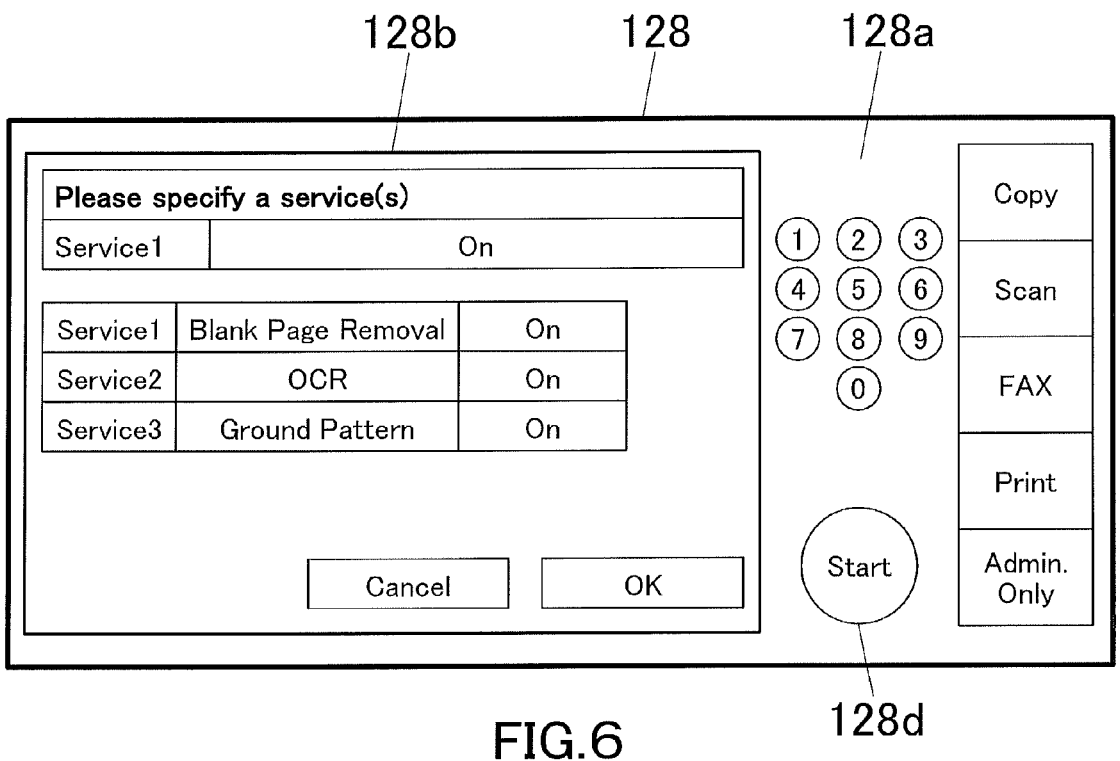
FIG. 6 is a two-dimensional view illustrating an operation panel which displays a service setting screen.
Figure 7:
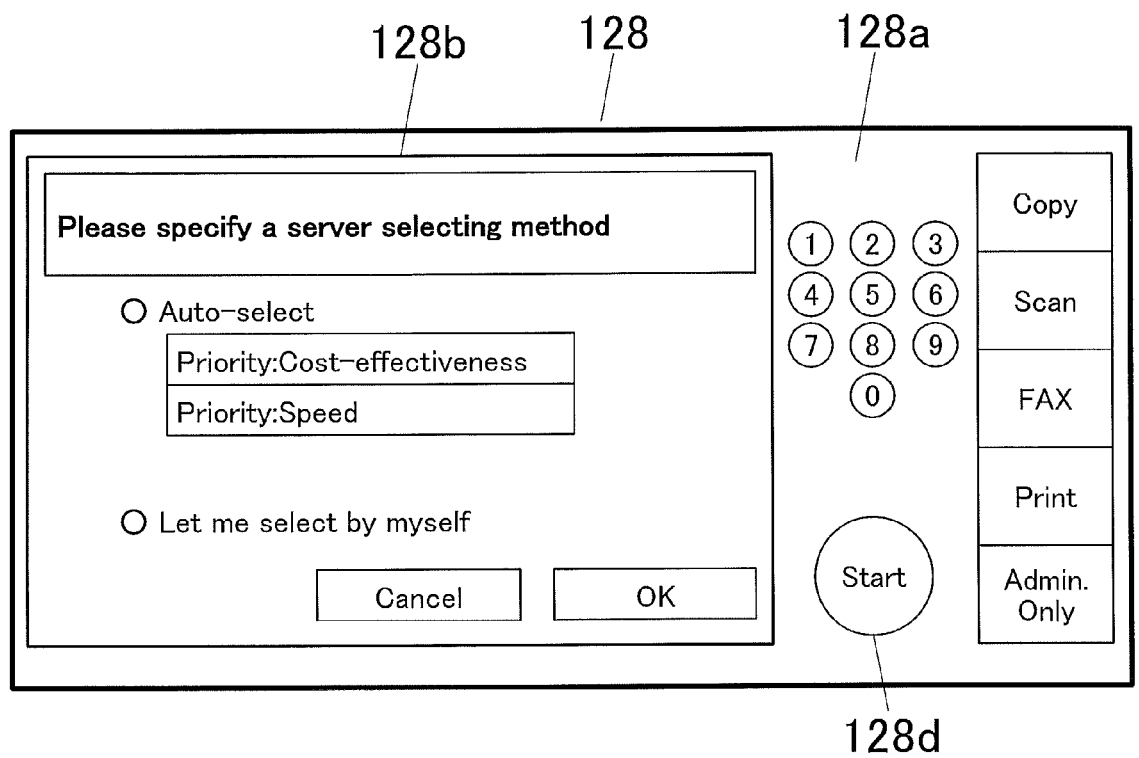
FIG. 7 is a two-dimensional view illustrating an operation panel which displays a server setting screen.

The user is allowed to select his/her preferred image processing services via a service setting screen as illustrated in FIG. 6. The image processing services will be performed in the order in which the user selected them via the screen. And the user is also allowed to select a server selecting method based on which to select an image processing server, via a server setting screen as illustrated in FIG. 7. In this mode of implementation, the user can find the following two options: 'Auto Select' and 'Let me select by myself' in this screen. When proceeding with 'Auto Select,' the user is further allowed to select one of the following three priorities, 'Cost-effectiveness,' 'Speed,' and 'Quality' as a selection criterion. When the user selects any of the priorities, 'Cost-effectiveness,' 'Speed,' and 'Quality' via the screen, the image forming apparatus 1 starts preparations to enable the selected function.

Specifically when the user selects 'Cost-effectiveness' as a selection criterion, the priority is set to cost-effectiveness; the image forming apparatus 1 automatically selects an image processing server ensuring the lowest charge among a plurality of image processing servers in charge of every image processing service. In this case, the user accordingly will be able to receive a series of his/her selected image processing services at the lowest charge available.

Specifically when the user selects 'Speed' as a selection criterion, the priority is set to processing speed; the image forming apparatus 1 automatically selects an image processing server ensuring the shortest processing time among a plurality of image processing servers in charge of every image processing service. In this case, the user accordingly will be able to finish a series of his/her selected image processing services in the shortest time available.

In this way as described above, the user is allowed to select a criterion to select an image processing server so that an image processing server matching this selection criterion will be automatically selected, which means that the image processing system can provide a series of image processing services that best meets the user requirements. The following description relates to the operations to be performed when the user selects 'Cost-effectiveness' as a selection criterion of Auto Select.

When the user presses the Start key 128d, the image forming apparatus 1 starts the operations.

At the time of registration of the available image processing services, the image forming apparatus 1 receives from the image processing servers 21a-21c, 22a-22c, 23a-23c, notices of the 'function', 'location', 'reference value (the number of the target sides of sheets, the number of characters, or the size of document space)', and the like of the available image processing services, then stores them on itself.

With a press of the Start Key 128b, the image forming apparatus 1 reads a document to import a document image therefrom, by the scanner 11. The image forming apparatus 1 generates service information which includes: all the image processing services that the user selected; and order information indicating the order of the image processing services.

FIG. 8 illustrates one example of service information. In this example, service information is a table which is composed of: a specified order of the image processing services; addresses of the transfer ports via which the image processing servers 21a-21c, 22a-22c, 23a-23c transmit a document image; addresses of the communication ports via which the image processing servers 21a-21c, 22a-22c, 23a-23c transmit various information other than a document image; titles of the image processing services; reference items based on which the image processing servers 21a-21c, 22a-22c, 23a-23c calculate their charges; charges per unit which depend on the value of the reference items; standard values of the image processing services; and methods of examining the quality of service. In other words, the service information includes all information from the image processing servers collectively. As shown in the table of service information in FIG. 8, the image processing servers 21a, 21b, 21c, 22a, 22b, 22c, 23a, 23b, and 23c are listed in this order from the upper row towards the bottom row. The image forming apparatus 1 preliminarily stores the following information objects in the table of service information: an order of the image processing services; addresses of the transfer ports, addresses of the communication ports; titles of the image processing services; reference items; and charges per unit.

Standard values in the table of service information, serving to examine the quality of service based on the test results returned from the image processing servers, indicates levels of the quality of service which are ordinarily required for the image processing services. For example, the standard value, the level of 99 percentages in the table of service information indicates the required accuracy of character recognition. The image forming apparatus 1 determines standard values for the image processing services and writes in the table of service information. Here, the table of service information does not have a standard value for the final image processing service because the image forming apparatus 1 examines if the image processing servers 23a-23c satisfy the required level of the quality of the final image processing service. An administrator-level user (operator) may determine in advance standard values for the image processing services, and the standard values may be changed depending on the job, based on job mode information or the like. The present image processing server may employ a standard value determined by any of the image processing servers in charge of the next image processing service in order to give priority to the quality of the next image processing service. The present image processing server may receive a reference image having been subjected to the last image processing service and examine if the test results returned from those in charge of the last image processing service are equal to or higher than a standard value indicated by the reference image.

As well as service information, the image forming apparatus 1 further generates most preferred server information as illustrated in FIG. 9, estimation reference information as illustrated in FIG. 10, and selection criteria information.

The most preferred server information as illustrated in FIG. 9 is a table to refer to an image processing server which is selected as the most preferred server for the 'Cost-effectiveness' among multiple image processing servers in charge of the last image processing service.

The estimation reference information as illustrated in FIG. 10 is a table containing destination addresses, reference items, and confirmed values for the reference items.

The selection criteria information indicates the user's selected priority 'Cost-effectiveness', 'Speed', or 'Quality' according to which the most preferred server will be automatically selected.

The document image obtained by the image forming apparatus 1, the service information, the most preferred server information, the estimation reference information, and the selection criteria information generated by the image forming apparatus 1 are transmitted to each of the image processing servers 21a-21c in charge of the first image processing service, as indicated by Arrow [1] of FIG. 1.

In this mode of implementation, as shown in the table of service information of FIG. 8, the image processing servers 21a-21c, 22a-22c, 23a-23c transmit and receive among themselves, a document image and various types of information such as service information and estimation reference information, separately using their different communication ports. In other words, the image forming apparatus 1 transmits a document image and such various types of information to the image processing servers 21a-21c separately via different transfer routes, while the image processing servers 21a-21c, 22a-22c, 23a-23c transmit and receive them among themselves also separately via different transfer routes. More specifically, the image forming apparatus 1 gives to a document image and such various types of information, a job number to identify a series of image processing services which is currently under processing, and transmits them all to the image processing servers 21a-21c.

And the image forming apparatus 1 also confirms the number of sheets by reading a document by the scanner 11, writes a value as the number of the target sides of sheets in the estimation reference information as shown in FIG. 10, and transmits the estimation reference information to the image processing servers 21a-21c.

The image processing servers 21a-21c start the following operations when receiving a document image, service information, most preferred server information, estimation reference information, and selection criteria information from the image forming apparatus 1.

The image processing servers 21a-21c determine a necessary operation for server selection, based on the selection criteria information received therefrom. In this mode of implementation, there is a need to determine a set of image processing servers ensuring the lowest charge (select a transfer route for processing) because 'Cost-effectiveness' is selected as a selection criterion as previously mentioned. Recognizing this, the image processing servers 21a-21c calculate their charges for the image processing service 1 and perform preparations for transferring estimation reference information to the image processing servers 22a-22c in charge of the next image processing service. And the image processing servers 21a-21c store the selection criteria information and the service information if needed, then transfer both of them to the image processing servers 22a-22c in charge of the next image processing service according to the order indicated by the service information. The image processing servers 21a-21c cannot select a most preferred server among those in charge of the last image processing service because of being in charge of the first image processing service. Therefore, the image processing servers 21a-21c also transfers the most preferred server information to the image processing servers 22a-22c in charge of the next image processing service without updating.

Subsequently, the image processing servers 21a-21c remove blank pages in the document image received from the image forming apparatus 1. After the image processing service 2, the image processing servers 22a-22c transfer the document image to the image processing servers 22a-22c in charge of the next image processing service according to the order indicated by the service information.

Furthermore, the image processing servers 21a-21c calculate their charges for removing blank pages based on their numbers of the target sides of sheets in the estimation reference information received from the image forming apparatus 1. For example, as for the image processing server 21a, being provided with 10 yen as the charge per unit and 20 as the number of the target sides of sheets according to the service information and the estimation reference information, respectively, the charge for this service equals 200 yen.

Similarly, as for the image processing server 21b, being provided with 20 yen as the charge per unit and 20 as the number of the target sides of sheets according to the service information and the estimation reference information, respectively, the charge for this service equals 400 yen.

Similarly, as for the image processing server 21c, being provided with 30 yen as the charge per unit and 20 as the number of the target sides of sheets according to the service information and the estimation reference information, respectively, the charge for this service equals 600 yen.

And the image processing servers 21a-21c transfer the charge information indicating these calculated amounts, as server selection information, to the image processing servers 22a-22c in charge of the next image processing service.

While removing blank pages as the image processing service 1, the image processing servers 21a-21c extract image specification information from the document image. And when confirming the reference values for the image processing servers 22a-22c in charge of the image processing service 2, the image processing servers 21a-21c write the confirmed values in estimation reference information and transfer the estimation reference information to the image processing servers 22a-22c. Although the reference item of the image processing server 22a is the number of characters which is supposed to be obtained by character recognition, the image processing servers 21a-21c are not capable of confirming such a number. Therefore, the image processing servers 21a-21c transmit the estimation reference information to the image processing server 22a without adding any information to the relevant field.

For example, the image processing servers 21a, 21b, and 21c obtain 15, 17, and 19 target sides of sheet, respectively, as shown in the table of FIG. 11. In this case, the image processing server 21a writes that number in the estimation reference information to be transferred to the image processing servers 22a-22c, as shown in the table of FIG. 12a. That it, the image processing server 21a writes a reference item based on which the image processing servers 22a-22c will estimate their charges and a confirmed value for the reference item, in the estimation reference information. Specifically, the number of the target sides of sheets, 15, confirmed by the image processing server 21a, is written in the corresponding column of the image processing servers 22b and 22c. And there is no confirmed value in the corresponding column of the image processing server 22a because the number of characters is supposed to be obtained by character recognition as mentioned above.

Similarly, the image processing server 21b transmits the estimation reference information as shown in FIG. 12b to the image processing servers 22a-22c in charge of the next image processing service; specifically, the number of the target sides of sheets, 17, confirmed by the image processing server 21b, is written in the corresponding column of the image processing servers 22b and 22c.

Similarly, the image processing server 21c transmits the estimation reference information as shown in FIG. 12b to the image processing servers 22a-22c in charge of the next image processing service; specifically, the number of the target sides of sheets, 19, confirmed by the image processing server 21c, is written in the corresponding column of the image processing servers 22b and 22c.

The image processing servers 22a-22c start the following operations when receiving a document image, selection criteria information, service information, most preferred server information, estimation reference information, and charge information from the image processing servers 21a-21c.

The image processing servers 22a-22c perform server selection: selecting one of the image processing servers 21a-21c as the most preferred server based on the selection criteria information received therefrom. In this mode of implementation, there is a need to select a server ensuring the lowest charge among the image processing servers 21a-21c in charge of the image processing service 1, because 'Cost-effectiveness' is selected as a selection criterion.

In other words, the image processing servers 22a-22c perform server selection by examining the charge information received from the image processing servers 21a-21c in charge of the image processing service 1.

Specifically, in this mode of implementation, the image processing servers 22a-22c transmit a test pattern to the image processing servers 21a-21c, collect therefrom the results (test results) of performing the image processing service 1 on the test pattern, select only servers having returned the test results which are judged as being equal to or higher than the standard value, and further select a sever ensuring the lowest charge among the servers having proved the required level of the quality of service by the test results.

Also, in this mode of implementation, the image processing servers 22a-22c have a test pattern stored in advance on their own memories 214 or the like. Alternatively, the image forming apparatus 1 may have a test pattern stored in advance on the NV-RAM 129 or the like to transfer to the image processing servers 21a-21c. The test pattern is a material sufficient to examine the quality of service of the image processing servers 21a-21c. There are different test patterns prepared on the memory 214 depending on the image processing service of the image processing servers in charge of the last image processing service. For example, in the case where the present image processing server performs character recognition after the operation of merging a QR code or string to a document image, there is a possibility that the present image processing server may fail character recognition with accuracy depending on the position of the document image where a QR code of string is given or the method of the data merging operation. To prevent such a trouble, the present image processing server selects servers which would not adversely affect character recognition by analyzing the test results returned from the image processing servers in charge of the last image processing service.

The image processing servers 21a-21c, which are in charge of removing blank pages, transmit a test pattern suitable for removing blank pages to the image processing servers 21a-21c. Receiving this test pattern, the image processing servers 21a-21c removes blank pages from the test pattern and returns to the image processing servers 22a-22c the test result which is a test image obtained by blank page removing.

The image processing servers 22a-22c examine the accuracy of blank page removing based on the test images from the image processing servers 21a-21c, compares the accuracy to a standard value written in the table of service information, judges whether or not the image processing servers 21a-21c could prove the required level of the quality of service. The image processing servers 22a-22c keep servers having proved it as options while removing servers having failed to prove it.

After removing blank pages from a test pattern received, in this mode of implementation, the image processing servers 21a-21c are configured to return the test results, test images obtained by blank page removing, to the image processing servers 22a-22c. Alternatively, after removing blank pages from a test pattern received, the image processing servers 21a-21c may be configured to examine the accuracy of blank page removing based on test images obtained by themselves and return a notice of the test results to the image processing servers 22a-22c.

FIG. 13a is a table of charge information from the image processing servers 21a-21c. Here, the image processing servers 21b can offer its service at the lowest charge among the image processing servers 21a-21c while failing to prove the required level of the quality of service by the test results, stating 'NG' in the table of charge information. Therefore, the image processing servers 22a-22c select the image processing servers 21a and 21c both having proved the required level of the quality of service by the test results, stating 'OK' in the table of charge information, and further selects among them, the image processing server 21a which can offer its service at the lowest charge, as the most preferred server.

And the image processing servers 22a-22c write the image processing server 21a and the amount of charge calculated, 400 yen, in the corresponding columns of the image processing service 1 in the most preferred server information as shown in FIG. 13b, then transfer the most preferred server information to the image processing servers 23a-23c according to the order indicated by the service information. The image processing servers 22a-22c store the selection criteria information and the service information if it is necessary, and then transfer both of them to the image processing servers 23a-23c along with or separately from the most preferred server information.

Subsequently, the image processing servers 22a-22c perform character recognition as the image processing service 2 on the document image received from the image processing server 21a which is selected as the most preferred server. After the image processing service 2, the image processing servers 22a-22c transfer the document image to the image processing servers 23a-23c in charge of the next image processing service according to the order indicated by the service information.

Furthermore, the image processing server 22a-22c further calculate their charges for character recognition based on the estimation reference information received from the image processing server 21a which is selected as the most preferred server.

There is no confirmed value for the image processing server 22a in the estimation reference information received from the image processing server 21a, because the number of characters is supposed to be obtained by character recognition. That is the reason why the image processing servers 22a-22c need to store the number of characters obtained by character recognition to calculate their charges. For example, being provided with 100 as the number of characters obtained by character recognition and 8 yen as the charge per unit according to the service information, the charge for this service equals 800 yen.

The image processing server 22b calculates its charge for this service based on the number of the target sides of sheets, which is the confirmed value, 15 for example, in the estimation reference information received from the image processing server 21a. Further being provided with 50 yen as the charge per unit according to the service information, the charge for this service equals 750 yen.

The image processing server 22c also calculates its charge for this service based on the number of the target sides of sheets, which is the confirmed value, 15 for example, just like the image processing server 22b. Further being provided with 60 yen as the charge per unit according to the service information, the charge for this service equals 900 yen.

And the image processing servers 22a-22c transfer the charge information indicating these calculated amounts, to the image processing servers 23a-23c in charge of the next image processing service.

While performing character recognition as the image processing service 2, the image processing servers 22a-22c detect the reference items based on which the image processing servers 23a-23c calculate their charges, if it is possible. In this mode of implementation, it is possible for the image processing servers 22a-22c to detect the number of characters based on which the image processing servers 23a-23c in charge of the next image processing service will calculate their charges for this service. And when confirming the reference values for the image processing servers 23a-23c, the image processing servers 22a-22c write the confirmed values in the estimation reference information and transfer the estimation reference information to the image processing server 23a-23c.

For example, if the image processing servers 22a, 22b, and 22c have detected the following values: 100, 110, and 90 as the number of characters as shown in FIG. 14, respectively, by performing character recognition, the image processing server 22a transmits the estimation reference information as shown in FIG. 15a to the image processing servers 23a-23c in charge of the next image processing service. And the estimation reference information includes the reference item of the image processing servers 23a-23c and the reference value for the item; specifically, the number of characters, 100, confirmed by the image processing server 22a, is written in the corresponding column of the image processing servers 23a-23c.

Similarly, the image processing server 22b transmits the estimation reference information as shown in FIG. 15b to the image processing servers 23a-23c in charge of the next image processing service; specifically, the number of characters, 110, confirmed by the image processing server 22b, is written in the corresponding column of the image processing servers 23a-23c.

Also similarly, the image processing server 22c transmits the estimation reference information as shown in FIG. 15c to the image processing servers 23a-23c in charge of the next image processing service; specifically, the number of pages, 90, confirmed by the image processing server 22c, is written in the corresponding column of the image processing servers 23a-23c.

The image processing servers 22a-22c start the following operations when receiving a document image, selection criteria information, service information, most preferred server information, estimation reference information, and charge information from the image processing servers 22a-22c.

The image processing servers 23a-23c perform server selection: selecting one of the image processing servers 22a-22c as the most preferred server based on the selection criteria information received therefrom. In this mode of implementation, there is a need to select a server ensuring the lowest charge among the image processing servers 22a-22c in charge of the image processing service 2, because 'Cost-effectiveness' is selected as a selection criterion.

In other words, the image processing servers 23a-23c perform server selection by examining the charge information received from the image processing servers 22a-22c in charge of the image processing service 2. Specifically, in this mode of implementation, the image processing servers 23a-23c transmit a test pattern to the image processing servers 22a-22c, collect therefrom the results of performing the image processing service 2 on the test pattern, select only servers having returned the test results which are judged as being equal to or higher than the standard value, and further select a sever ensuring the lowest charge among the servers having proved the required level of the quality of service by the test results.

FIG. 16a is a table of charge information from the image processing servers 22a-22c. Here, the image processing servers 22b can offer its service at the lowest charge among the image processing servers 22a-22c while failing to prove the required level of the quality of service by the test results, stating 'NG' in the table of charge information. Therefore, the image processing servers 23a-23c select the image processing servers 22b and 22c both having proved the required level of the quality of service by the test results, stating 'OK' in the table of service information, and further selects among them, the image processing server 22b which can offer its service at the lowest charge, as the most preferred server.

And the image processing servers 23a-23c write the image processing server 22b and the amount of charge calculated, 750 yen, in the corresponding columns of the image processing service 2 in the most preferred server information as shown in FIG. 16b, then transfer the most preferred server information to the image forming apparatus 1 according to the order indicated by the service information, along with or separately from the selection criteria information and the service information.

Subsequently, the image processing servers 23a-23c perform translation as the image processing service 3 on the document image received from the image processing server 22b which is selected as the most preferred server. After the image processing service 3, the image processing servers 23a-23c transfer the document image to the image forming apparatus 1, the final destination according to the order indicated by the service information.

The image processing server 23a-23c further calculate their charges for translation based on the estimation reference information received from the image processing server 22b which is selected as the most preferred server.

The image processing servers 23a-23c calculate their charges for this service based on the number of characters which is the confirmed value, 110, specified in the estimation reference information received from the image processing server 22b. Further being provided with 70 yen, 80 yen, and 90 yen as their charges per unit according to the service information, their charges for this service equal 7,700 yen, 8,800 yen, and 9,900 yen, respectively.

The charge information including these amounts of charge calculated is transferred to the image forming apparatus 1.

The image processing servers 23a-23c do not need to transfer the estimation reference information to the image forming apparatus 1 because they are in charge of the image processing service 3 which is the final one. The image processing servers 23a-23c do not either need to transfer the selection criteria information and the service information to the image forming apparatus 1.

Receiving at least, the document image, the most preferred server information, and the charge information from the image processing servers 23a-23c in charge of the image processing service 3 which is the final one, the image forming apparatus 1 selects a server ensuring the lowest charge among the image processing servers 23a-23c, based on the selection criterion set on the image forming apparatus 1, 'Cost-effectiveness'.

In other words, the image forming apparatus 1 performs server selection by examining the charge information received from the image processing servers 23a-23c in charge of the image processing service 3. Specifically, in this mode of implementation, the image forming apparatus 1 transmits a test pattern to the image processing servers 23a-23c, collects therefrom the results of performing the image processing service 3 on the test pattern, selects only servers having returned the test results which are judged as being equal to or higher than the standard value, and further selects a sever ensuring the lowest charge among the servers having returned the test results which are judged as being equal to or higher than the standard value.

FIG. 17a is a table of charge information from the image processing servers 23a-23c. The image forming apparatus 1 selects the image processing server 23a as the most preferred server because it can offer the service at the lowest charge among the image processing servers 23a-23c while having returned the test results which are judged as being equal to or higher than the standard value. And the image forming apparatus 1 writes the image processing server 23a and the amount of charge calculated, 7,700 yen, in the corresponding columns of the image processing service 3 in the most preferred server information as shown in FIG. 17b. In this way as described above, a set of image processing servers (a transfer route for processing) and a total charge for the image processing services 1-3 have been determined.

Specifically, in this mode of implementation, if 'Speed' is selected as a selection criterion, the present image processing server also receives information indicating the time required for image processing (estimated time), as server selection information, from the image processing servers in charge of the last image processing service. The present image processing server selects only servers having returned the test results which are judged as being equal to or higher than the standard value, among those in charge of the last image processing service, and further selects a server ensuring the shortest processing time as the most preferred server, among the servers having proved the required level of the quality of service by the test results. In this case, it does not mean that all the image processing servers in charge of the last image processing service need to actually perform image processing on a document image before server selection. Alternatively, the present image processing server or the image forming apparatus 1 may select a most preferred server among those in charge of the last image processing service based on the estimated times received therefrom, in order to allow only the most preferred server to actually perform image processing on a document image. Alternatively, the present image processing server or the image forming apparatus 1 may select a server from which a document image having been subjected to image processing is received the earliest as the most preferred server, among those in charge of the last image processing service.

In another case, if 'Speed' is selected as a selection criterion, the present image processing server or the image forming apparatus 1 may select a server holding the smallest number of jobs in the queue as the most preferred server, among those in charge of the last image processing service, by comparing the job queue status, instead of by comparing the estimated times received therefrom. Also in this case, the present image processing server or the image forming apparatus 1 may select a most preferred server among those in charge of the last image processing service by comparing the job queue status, in order to allow only the most preferred server to actually perform image processing on a document image. The present image processing server or the image forming apparatus 1 may select a server which would finish performing image processing the earliest as the most preferred server, based on both the job queue status and estimated times.

As described above, in this mode of implementation, a plurality of image processing servers perform one of sequential image processing services on a target image received from an image forming apparatus, and there are a plurality of the plurality of image processing servers which cooperatively and orderly perform the sequential image processing services on the target image. More specifically, such an image processing server selects a most preferred server among the image processing servers in charge of the last image processing service; the image forming apparatus selects a most preferred server among the image processing servers in charge of the final image processing service; and all most preferred servers selected in this way are allowed to cooperatively and orderly perform the sequential image processing services on the target image. The image processing system is therefore allowed to select a most preferred server for each of the sequential image processing services without high-performance servers or image forming apparatuses being installed thereon, which is advantageous. Such an image processing server and the image forming apparatus 1 select a most preferred server among those in charge of the last image processing service and the final image processing service, respectively. The image processing system is therefore allowed to select a most preferred server for each of the sequential image processing services, among only servers which would not adversely affect a later image processing service.

Such an image processing server and the image forming apparatus 1 transmit a test pattern to those in charge of the last image processing service and the final image processing service; and collect the results of performing image processing on the test pattern from all those in charge of the last image processing service and the final image processing service, respectively; and select servers having proved the required level of the quality of service by comparing the test results to standard values. The image processing system is therefore allowed to select a most preferred server for each of the sequential image processing service, among only servers having proved the required level of the quality of service.

Figure 18A:
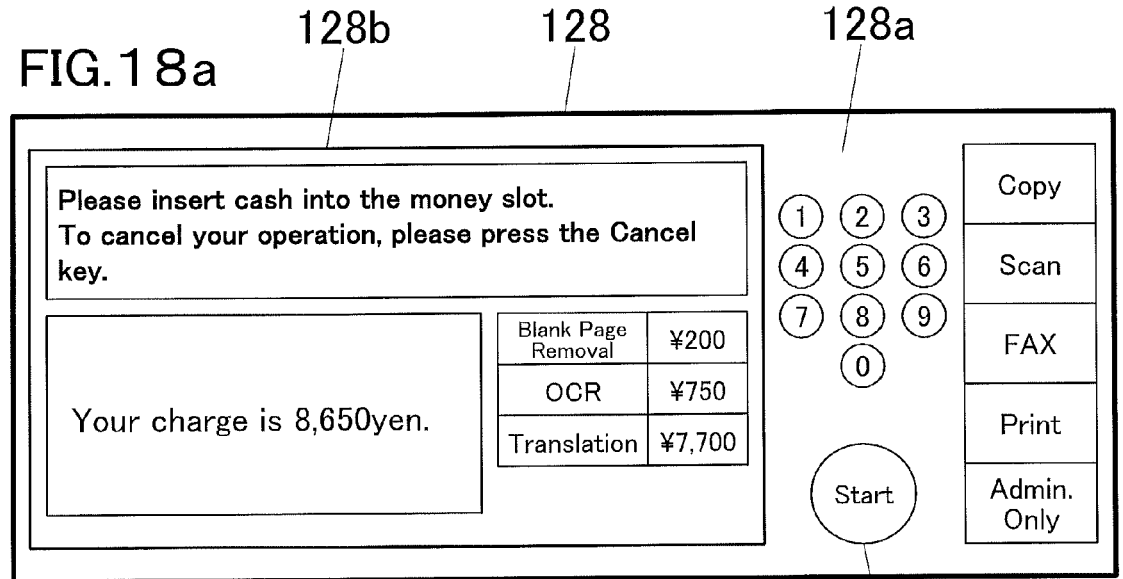
FIG. 18 is a view illustrating a display screen to appear on an operation panel of the image forming apparatus when a transaction is processed.
Figure 18B:
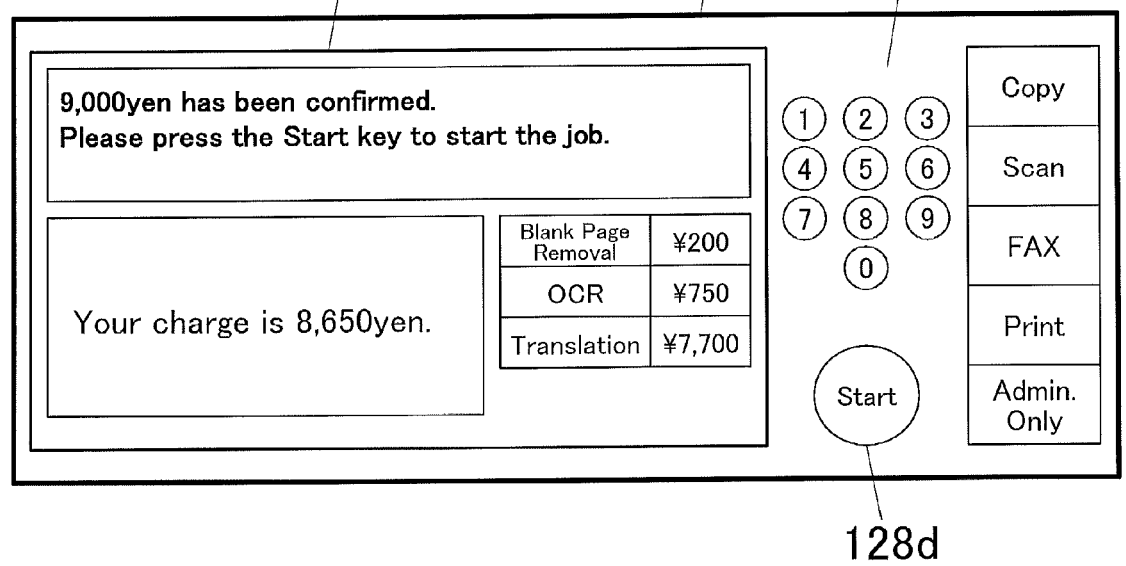

After that, the image forming apparatus 1 calculates the sum of the amounts of charge for all the image processing services, which are written in the most preferred server information, and makes the transaction processing apparatus 5 to process a transaction to charge the calculated amount. More specifically, the image forming apparatus 1 accesses the transaction processing apparatus 5 which is connected to the serial interface 130 to transmit thereto a notice of the calculated amount (the charge for the entire series of image processing services), and displays for the user, the calculated amount and a message requesting the user to enter as much money as the calculated amount on the display 128b of the operation panel 128, as illustrated in FIG. 18a. When the user inputs as much money as displayed thereon into the transaction processing apparatus 5, the transaction processing apparatus 5 starts processing a transaction, and the image forming apparatus 1 switches the current screen to another screen as illustrated in FIG. 18b, on the display 128b of the operation panel 128. When the user presses the Start key 128d, the image forming apparatus 1 starts printing the document image obtained by the image processing service or transmitting it to a certain address.

Hereinafter, the operations of the image forming apparatus 1 and the image processing servers 21a-21c, 22a-22c, 23a-23c will be further described with reference to some flowcharts.

The image forming apparatus 1 performs all operations under control of the CPU 121 according to operation programs stored on the program ROM 125 as described above.

Figure 19:
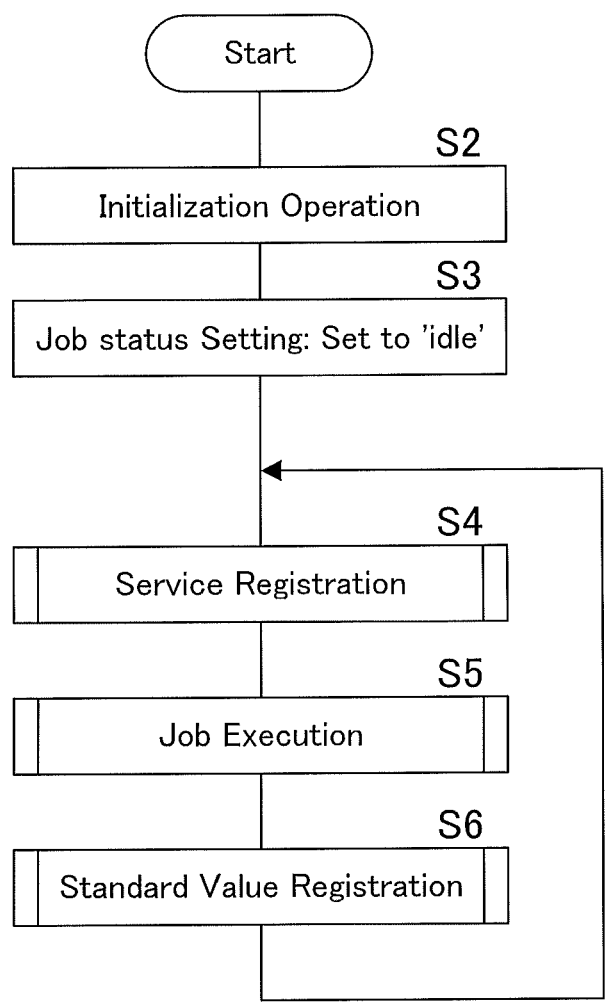
FIG. 19 is a flowchart representing a main processing routine of the image forming apparatus.

As illustrated in FIG. 19, when being provided with power, the image forming apparatus 1 performs an initialization operation, for example initializes the hardware and the like (Step S2). Subsequently, the image forming apparatus 1 initializes the 'job status' representing the status of the job to 'idle' (Step S3), registers available image processing services of the image processing servers 21a-21c, 22a-22c, 23a-23c on the image forming apparatus 1 itself (Step S4), and runs the job (Step S5). The image forming apparatus 1 then performs an operation of registering a standard value by which to examine the quality of service based on a test image (Step S6). And the image forming apparatus 1 repeats the operation of registering available image processing services (Step S4), the operation of running the job (Step S5), and the operation of registering a standard value (Step S6).

Figure 20:
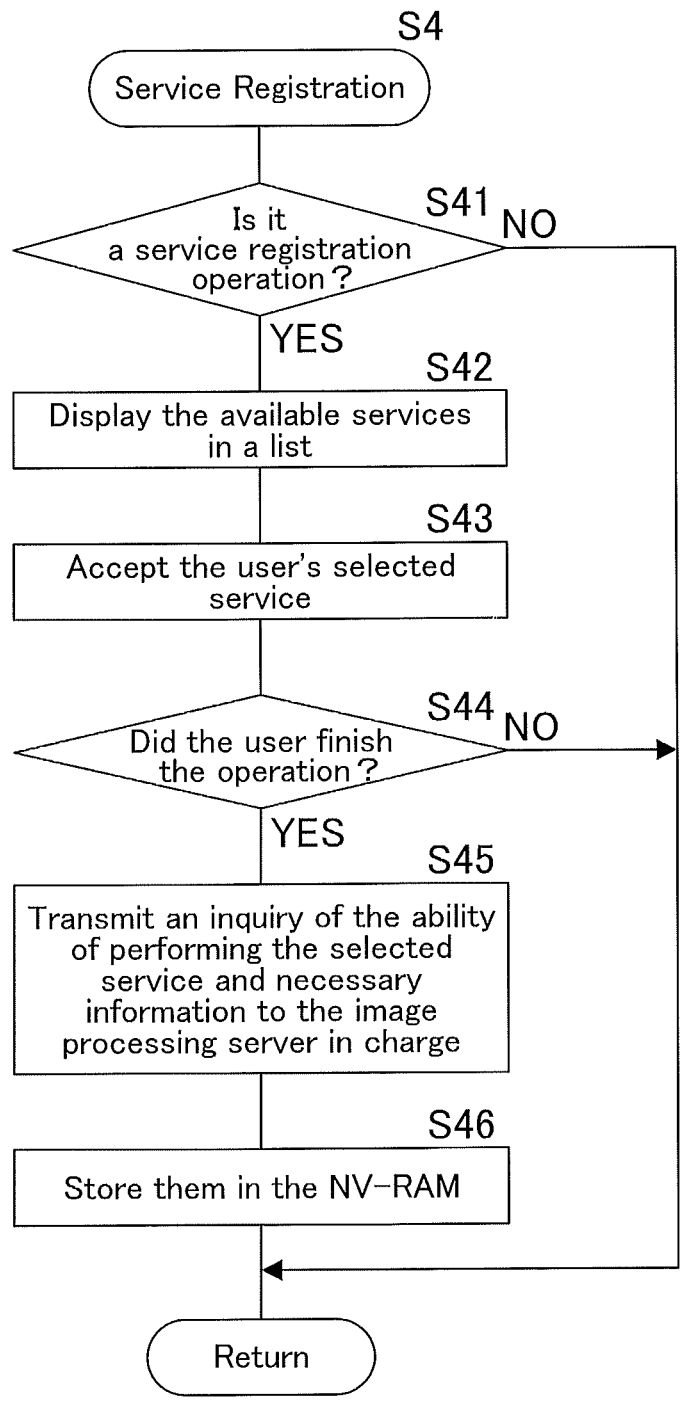
FIG. 20 is a flowchart representing a sub processing routine corresponding to a service registration operation (Step S4) in FIG. 19.

FIG. 20 is a flowchart representing a sub processing routine corresponding to a service registration operation (Step S4) in FIG. 19. It should be noted that an administrator user or the like is required to preliminarily register the available image processing services on the image forming apparatus 1.

In Step S41, it is judged whether or not what is intended via the operation panel 128 is a service registration operation. If it is not a service registration operation (NO in Step S41), the sub processing routine returns to the main processing routine. If it is a service registration operation (YES in Step S41), the available image processing services having been registered on the image forming apparatus 1 appear in a list (the registered items can be updated). The user selects a desirable image processing service, then the selected image processing service is accepted in Step S43. And according to user manipulation, it is judged whether or not the selection is finished in Step S44. If the selection is not finished (NO in Step S44), the sub processing routine returns to the main processing routine. If the selection is finished (YES in Step S44), an inquiry of the ability of performing the selected service and the necessary reference items for transaction processing is transmitted to the image processing server in charge in Step S45 and the obtained information is stored on the NV-RAM 129 in Step S46.

Figure 21:
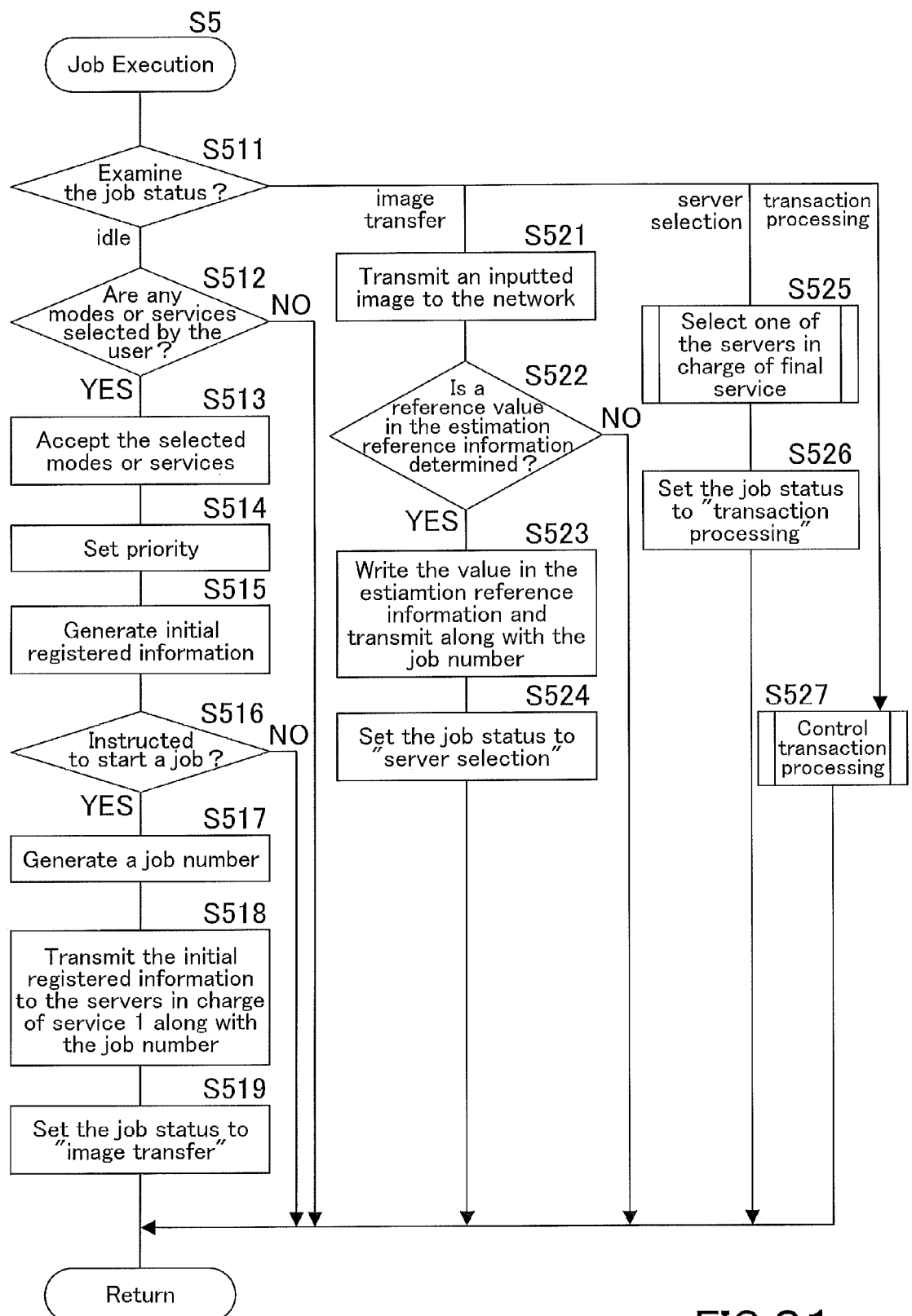
FIG. 21 is a flowchart representing a sub processing routine corresponding to a job execution operation (Step S5) in FIG. 19.

FIG. 21 is a flowchart representing a sub processing routine to select a series of image processing services and execute a job to perform it, corresponding to the job execution operation (Step S9) in FIG. 15.

The flag of 'job status' is examined, and the sub processing routine proceeds to different steps depending on which job status, 'idle', 'image transfer', or 'transaction processing', in Step S511.

If the flag of 'job status' is 'idle' in Step S51, it is judged in Step S512 whether or not any modes or image processing services are selected by the user via the operation panel 128. If no modes or image processing services are selected (NO in Step S512), the sub processing routine returns to the main processing routine. If any modes or image processing services are selected (YES in Step S512), a mode and service selection operation of the operation panel 128 is performed in Step S513. When the user selects 'Auto Select' as a server selecting method and further selects 'Cost-effectiveness', 'Speed', or 'Quality' as a priority, the priority is set to the selected option is Step S514.

Subsequently, service information, selection criteria information, and most preferred server information are generated in Step S515. Hereinafter, service information, selection criteria information, and most preferred server information will be collectively referred to as 'initial registered information'.

And in Step S516, it is judged whether or not the Start key is pressed by the user, in other words, there is an instruction to start the job. If there is not such an instruction (NO in Step S516), the sub processing routine returns to the main processing routine. If there is such an instruction (YES in Step S516), a job number is generated in Step S517. The initial registered information generated in Step S515 is transmitted to the image processing servers 21a-21c in charge of the first image processing service, along with the job number in Step S518; and the flag of 'job status' is set to 'image transfer' in Step S519. Then the sub processing routine returns to the main processing routine.

If the flag of 'job status' is 'image transfer' in Step S511, the sub processing routine proceeds to Step S521, in which an inputted document image is transmitted to the network. The document image inputted thereto may be an image read out from a document by the scanner 11 or a print image received from the terminal 31 or 32.

After the transmission, it is judged in Step S522 whether or not a reference value for the reference item in the estimation reference information is determined. If it has not been written yet (NO in Step S522), the sub processing routine returns to the main processing routine. If it is determined already (YES in Step S522), the sub processing routine proceeds to Step S523 in which: the determined reference value is written in the estimation reference information; and the estimation reference information is transmitted to the image processing servers 21a-21c along with the job ID.

After that, the flag of 'job status' is switched to 'selecting server' in Step S524, and the sub processing routine returns to the main processing routine.

If 'job status' is 'selecting server' in Step S511, the sub processing routine proceeds to Step S525, in which an image processing server is selected among those in charge of the final image processing service. After that, the flag of 'job status' is switched to 'transaction processing' in Step S526, and the sub processing routine returns to the main processing routine.

If the flag of 'jog status' is 'transaction processing' in Step 5511, the sub processing routine proceeds to Step S527 to perform a transaction processing operation, then returns to the main processing routine.

Figure 22:
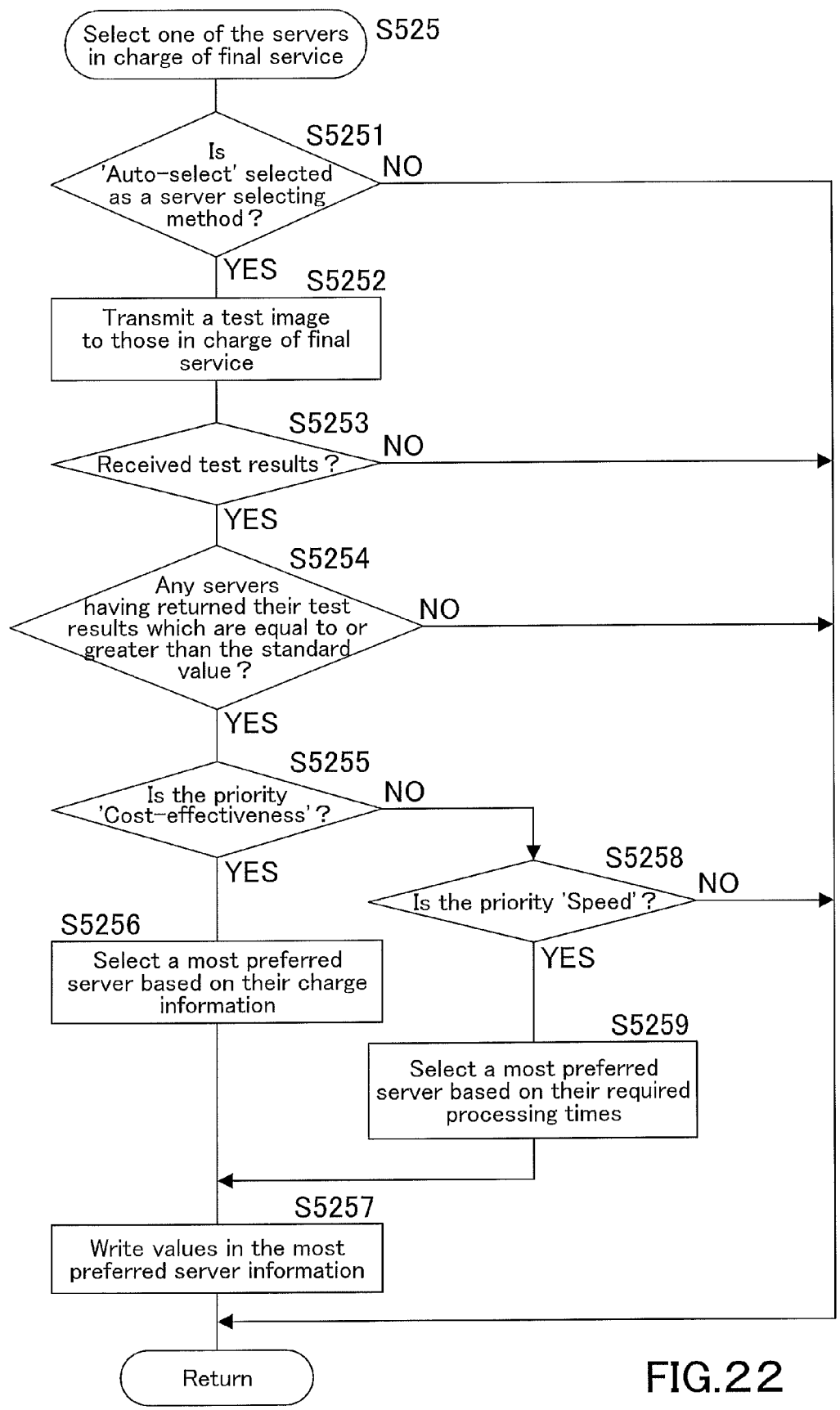
FIG. 22 is a flowchart representing a sub processing routine corresponding to a server selection operation (Step S64) in FIG. 21, the final image processing service.

FIG. 22 is a flowchart representing a sub processing routine corresponding to the server selection operation (Step S525) in FIG. 21.

In Step S5251, it is judged whether or not 'Auto Select' is selected as a server selecting method. If it is not 'Auto Select' (NO in Step S5251), the sub processing routine returns to the original sub processing routine.

If it is 'Auto Select' (YES in Step S5251), the sub processing routine proceeds to Step S5252 in which a test image (test pattern) is transmitted to the image processing servers 23a-23c in charge of the final image processing service.

After that, it is judged in Step S5253 whether or not the results of performing image processing on the test pattern have been returned from all the image processing servers 23a-23c. If the test results have not been returned from all of them (NO in Step S5253), the sub processing routine returns to the original sub processing routine. If the test results have been returned from all of them (YES in Step S5253), then it is judged in Step S5254 whether or not there are any servers having returned the test results which are judged as being equal to or higher than the standard value.

If there are no servers having returned a value equal to or greater than the standard value (NO in Step S5254), the sub processing routine returns to the original sub processing routine. If there are any servers having returned a value equal to or greater than the standard value (YES in Step S5254), then it is judged in Step S5255 whether or not the priority is 'Cost-effectiveness'. If it is 'Cost-effectiveness' (YES in Step S5255), by examining the charge information obtained from the image processing servers 23a-23c, a server ensuring the lowest charge is selected as the most preferred server among the servers having returned a value equal to or greater than the standard value, in Step S5256. After that, the sub processing routine proceeds to Step S5257.

In Step S5255, if it is not 'Cost-effectiveness', the sub processing routine proceeds to Step S5258, in which it is judged whether or not 'Speed' is selected as a selection criterion. If it is not 'Speed' (NO in Step S5258), the sub processing routine returns to the original sub processing routine. If it is 'Speed' (YES in Step S5258), by examining the required processing times obtained from the image processing servers 23a-23c in charge of the final image processing service, a server ensuring the shortest processing time is selected as the most preferred server in Step S5259. After that, the sub processing routine proceeds to Step S5257.

If 'Speed' is selected as a selection criterion, the image processing server selected as the most preferred server performs its own image processing service again so as to provide its charge information.

In Step S5257, the most preferred server and its charge information are written in the most preferred server information. After that, the sub processing routine returns to the original sub processing routine.

Figure 23:
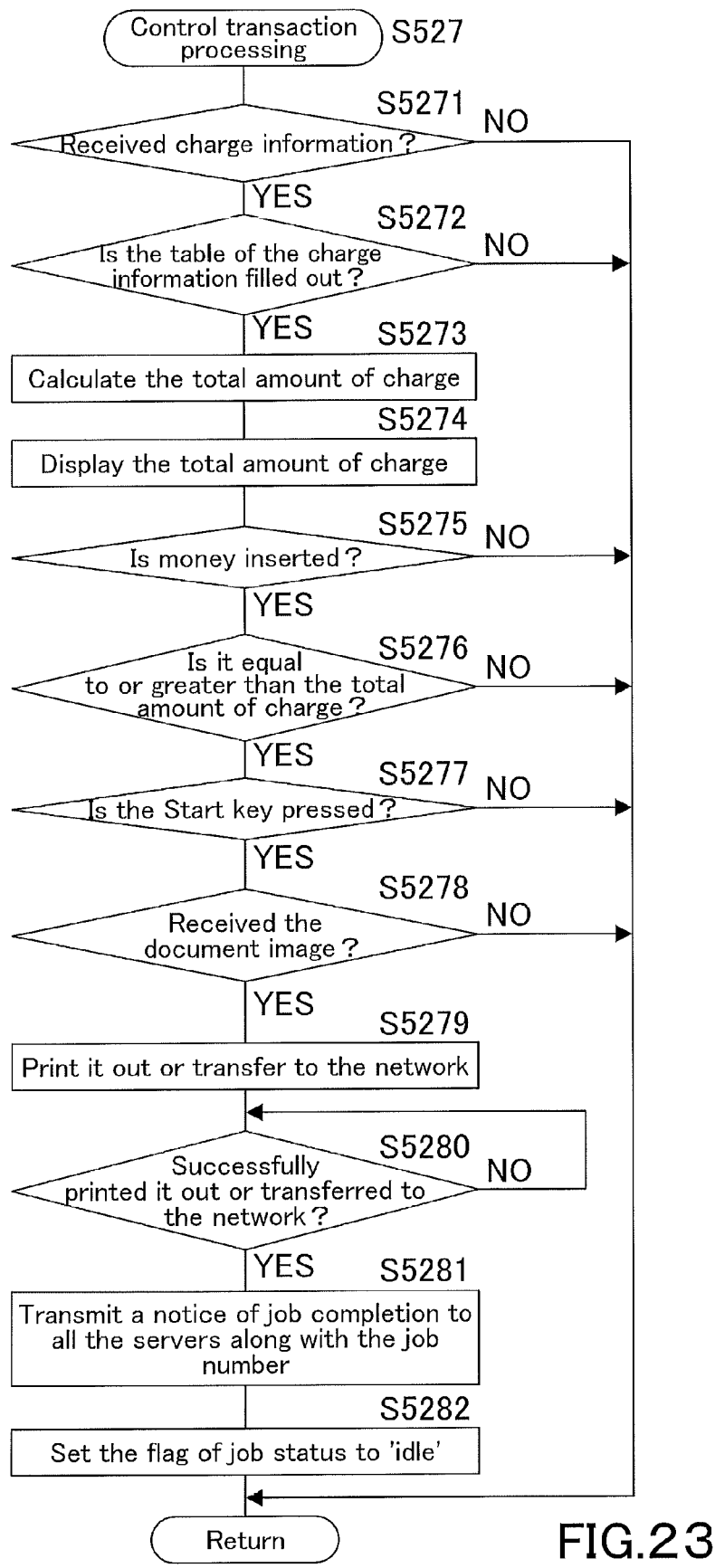
FIG. 23 is a flowchart representing a sub processing routine corresponding to a transaction processing operation (Step S67) in FIG. 21.

FIG. 23 is a flowchart representing a sub processing routine corresponding to the transaction processing operation (Step S527) in FIG. 21.

In Step S5271, it is judged whether or not the charge information and the like is received by the image forming apparatus 1. If it is not received yet (NO in Step S5271), the sub processing routine returns to the original sub processing routine. If it is received (YES in Step S5271), then it is judged in Step S5272 whether or not the table of the most preferred server information is filled out. If it is not filled out yet (NO in Step S5272), the sub processing routine returns to the original sub processing routine. If it is filled out (YES in Step S5272), the total amount of charge is calculated in Step S5273 and displayed on the display 128b of the operation panel 128 in Step S5274.

And in Step S5275, it is judged whether or not cash has been inserted into the money slot. If cash has not been inserted yet (NO in Step S5275), the sub processing routine returns to the original sub processing routine. If cash has been inserted (YES in Step S5275), then it is judged in Step S5276 whether or not the amount of money having been inserted is equal to or greater than the total amount of charge. If it is less than the total amount of charge (NO in Step S5276), the sub processing routine returns to the original sub processing routine.

If it is equal to or greater than the total amount of charge (YES in Step S5276), then it is judged in Step S5277 whether or not the Start key 128d is pressed. If it is not pressed (NO in Step S5277), the sub processing routine returns to the original sub processing routine. If it is pressed (YES in Step S5277), then it is judged in Step S5278 whether or not the document image is received after all the image processing services.

If it is not received yet (NO in Step S5278), the sub processing routine returns to the original sub processing routine.

If it is received (YES in Step S5278), it is printed out or transferred to the network in Step S5279. After that, the sub processing routine proceeds to Step S5280.

The sub processing routine stays at Step S5280 until the printing or transmitting operation has completed (NO in Step S5280). If the printing or transmitting operation has completed (YES in Step S5282), a notice of job completion is transmitted to all the image processing servers 21a-21c, 22a-22c, 23a-23c along with the job number in Step S5281, and the flag of 'job status' is switched to 'idle' in Step S5282. After that, the sub processing routine returns to the original sub processing routine.

In this mode of implementation, the transaction processing operation starts when cash is inserted into the transaction processing apparatus 5, however, the total amount of charge may be registered in advance on the image forming apparatus 1 so that it can charge that amount to the user's terminal 31, 32, or the like.

Figure 24:
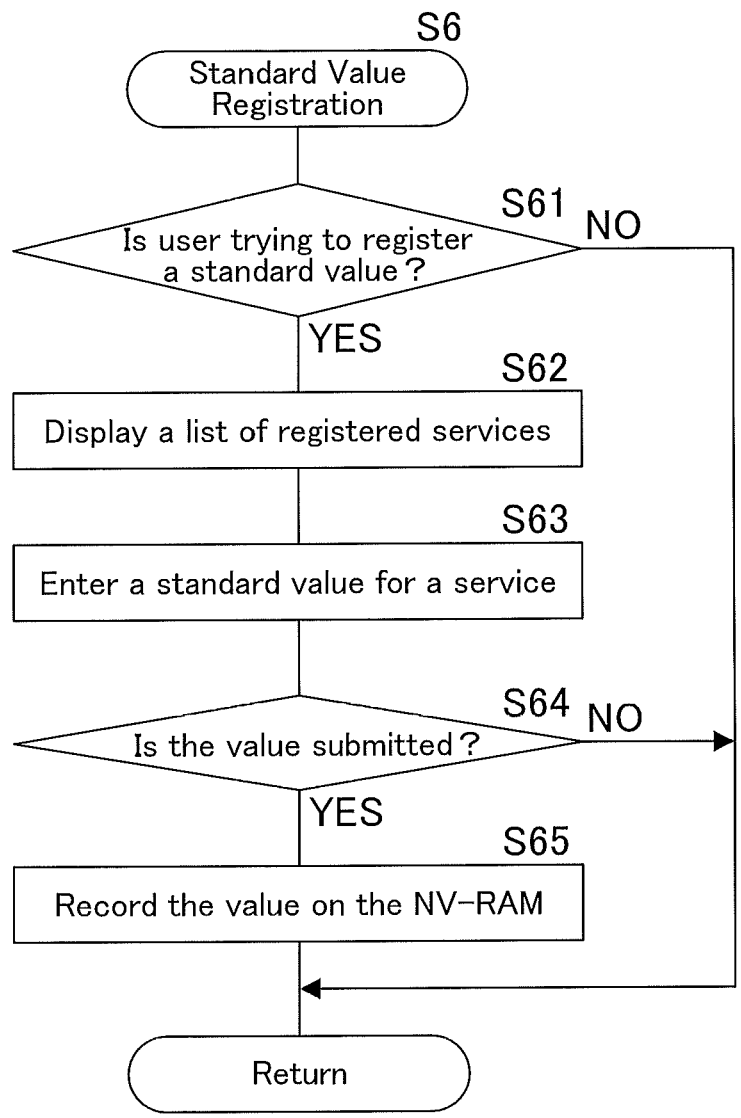
FIG. 24 is a flowchart representing a sub processing routine corresponding to a standard value registration operation (Step S6) in FIG. 19.

FIG. 24 is a flowchart representing a sub processing routine corresponding to the standard value registration operation (Step S6) in FIG. 19, in which standard values are entered by an administrator, for example.

In Step S61, it is judged whether or not the image forming apparatus 1 is being operated to register a standard value. If it is not (NO in Step S61), the sub processing routine returns to the main processing routine. If it is being operated to register a standard value (YES in Step S61), a list of registered services is displayed on the operation panel 128 in Step S62. A standard value entered for any of the registered service is accepted in Step S63, then it is judged in Step S64 whether or not the entered value is submitted.

If it is not submitted (NO in Step S64), the sub processing routine returns to the main processing routine. If the entered value is submitted (YES in Step S64), it is recorded on the NV-RAM 129 in Step S65, and the sub processing routine returns to the main processing routine. In this way described above, standard values for all the registered services can be registered.

Figure 25:
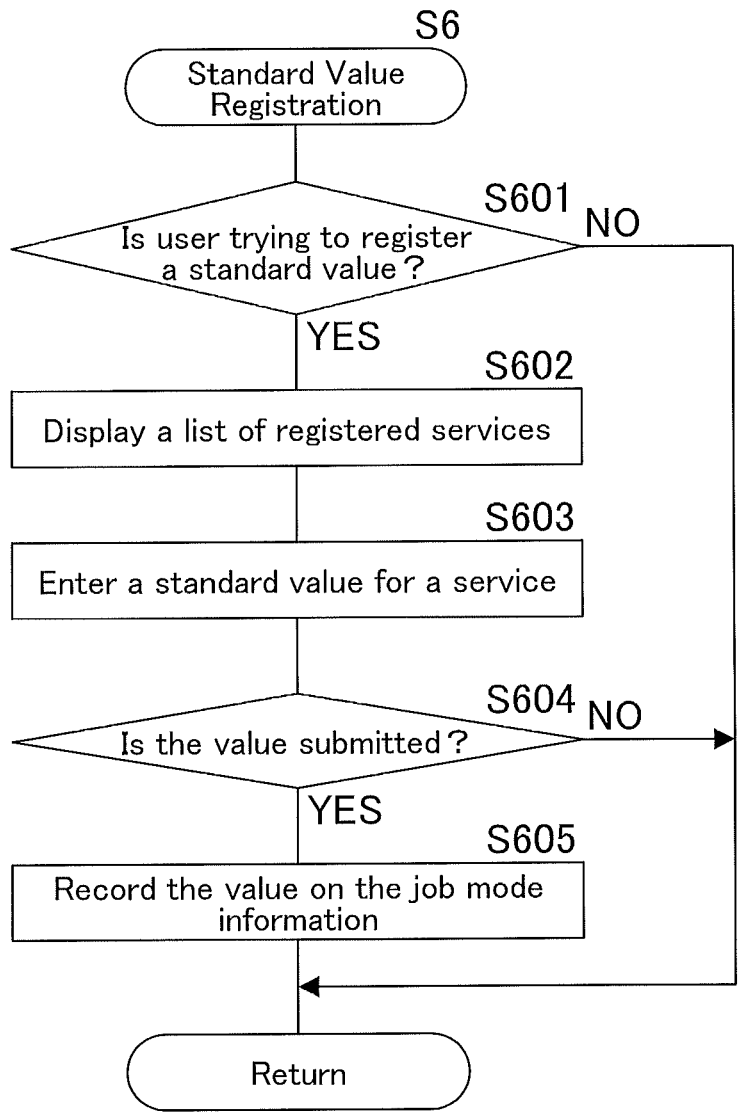
FIG. 25 is a flowchart representing another sub processing routine corresponding to an standard value entry operation (Step S6) in FIG. 19.

FIG. 25 is a flowchart representing a sub processing routine corresponding to the standard value registration operation in which a standard value needs to be entered for each job.

In Step S61, it is judged whether or not the image forming apparatus 1 is being operated to register a standard value. If it is not (NO in Step S61), the sub processing routine returns to the main processing routine. If it is being operated to register a standard value (YES in Step S61), a list of registered services is displayed on the operation panel 128 in Step S62. A standard value entered for any of the registered service is accepted in Step S63, then it is judged in Step S64 whether or not the entered value is submitted.

If it is not submitted (NO in Step S64), the sub processing routine returns to the main processing routine. If the entered value is submitted (YES in Step S64), it is recorded as job mode information in Step S65.

FIGS. 26-31 are flowcharts to further describe the operations of the image processing servers 21a-21c, 22a-22c, 23a-23c. The image processing servers 21a-21c, 22a-22c, 23a-23c perform all operations under control of their own CPUs 211 according to operation programs stored on their own recording mediums such as the ROMs 212 or the memories 214.

Figure 26:
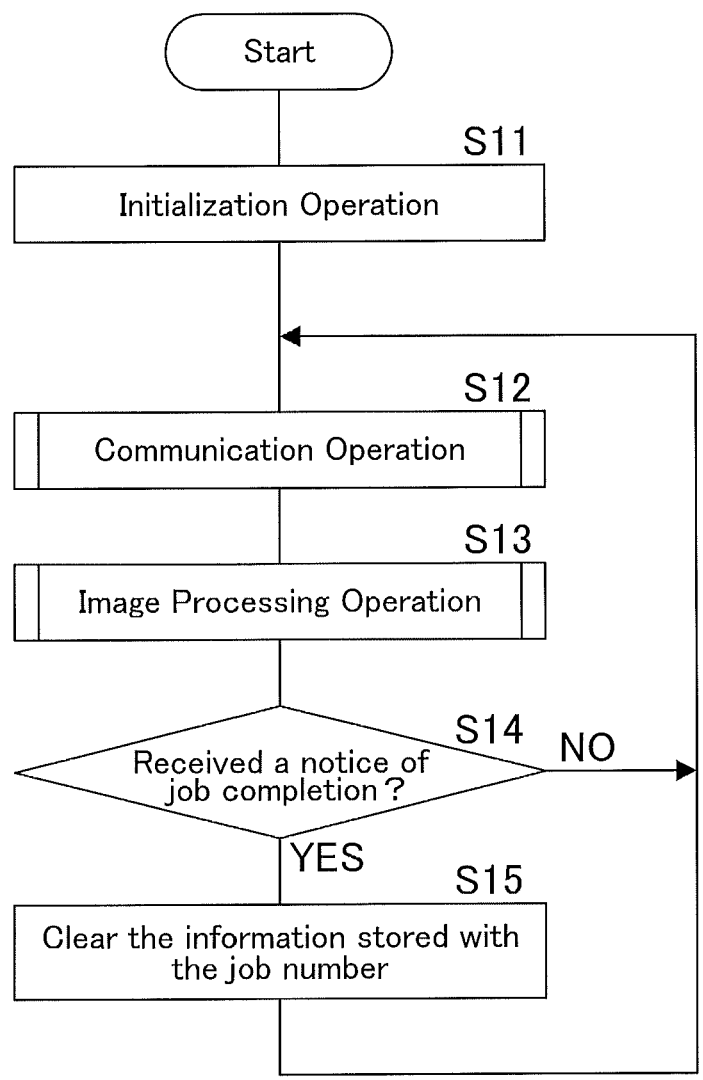
FIG. 26 is a flowchart representing a main processing routine of the image processing servers.

FIG. 26 is a flowchart representing a main processing routine of the image processing servers 21a-21c, 22a-22c, 23a-23c.

The image processing servers 21a-21c, 22a-22c, 23a-23c individually perform a program initialization operation (Step S11), a communication operation (Step S12), and an image processing operation (Step S13) in this order. After that, it is judged in Step S14 whether or not a notice stating that the job has been completed is received from the image forming apparatus 1. If it is not received yet (NO in Step S14), the main processing routine returns to Step S12. If it is received already (YES in Step S14), the information stored with the job number is cleared in Step S15.

Here, the image processing servers 21a-21c, 22a-22c, 23a-23c may be configured to perform the communication operation (Step S12) and the image processing operation (Step S13) in another process.

Figure 27:
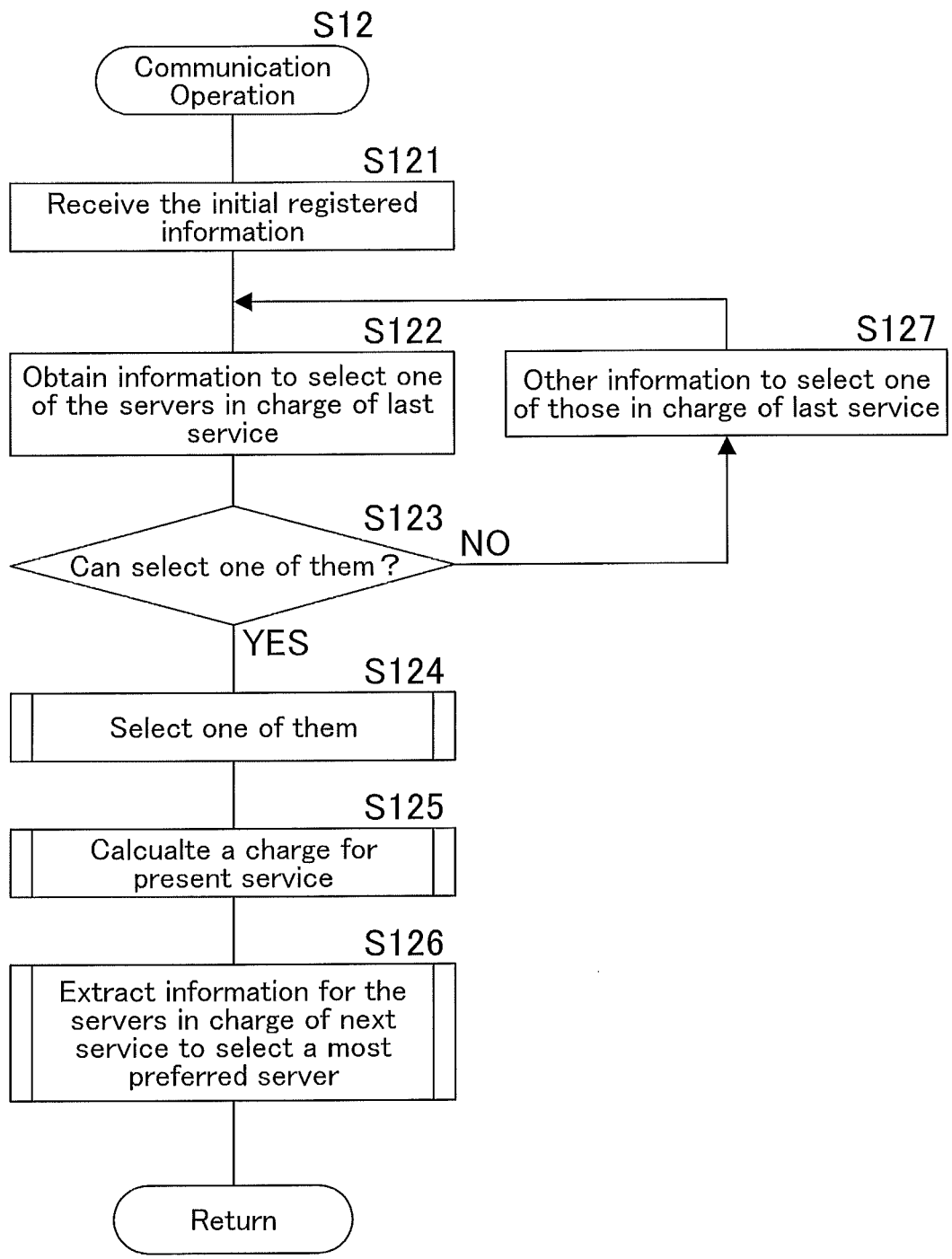
FIG. 27 is a flowchart representing a sub processing routine corresponding to a communication operation (Step S12) in FIG. 26.

FIG. 27 is a flowchart representing a sub processing routine corresponding to the communication operation (Step S12) in FIG. 26.

The present image processing server receives the initial registered information in Step S121, and further receives information for selecting one of those in charge of the last image processing service in Step S122. And in Step S123, it is judged whether or not it is enough for such a selection operation. If it is not enough (NO in Step S123), the sub processing routine waits until other information for selecting one of those in charge of the last image processing service is received in Step S127, and then returns to Step S122.

If it is enough for such a server selection operation (YES in Step S123), the present image processing server performs the server selection operation in Step S124, performs a charge estimation operation, i.e. estimates the charge for its responsible image processing service in Step S125 and further performs an operation to extract information for those in charge of the next image processing service to select the most preferred server in Step S126. After that, the sub processing routine returns to the main processing routine. Hereinafter, each of these operations will be described in more detail.

Figure 28:
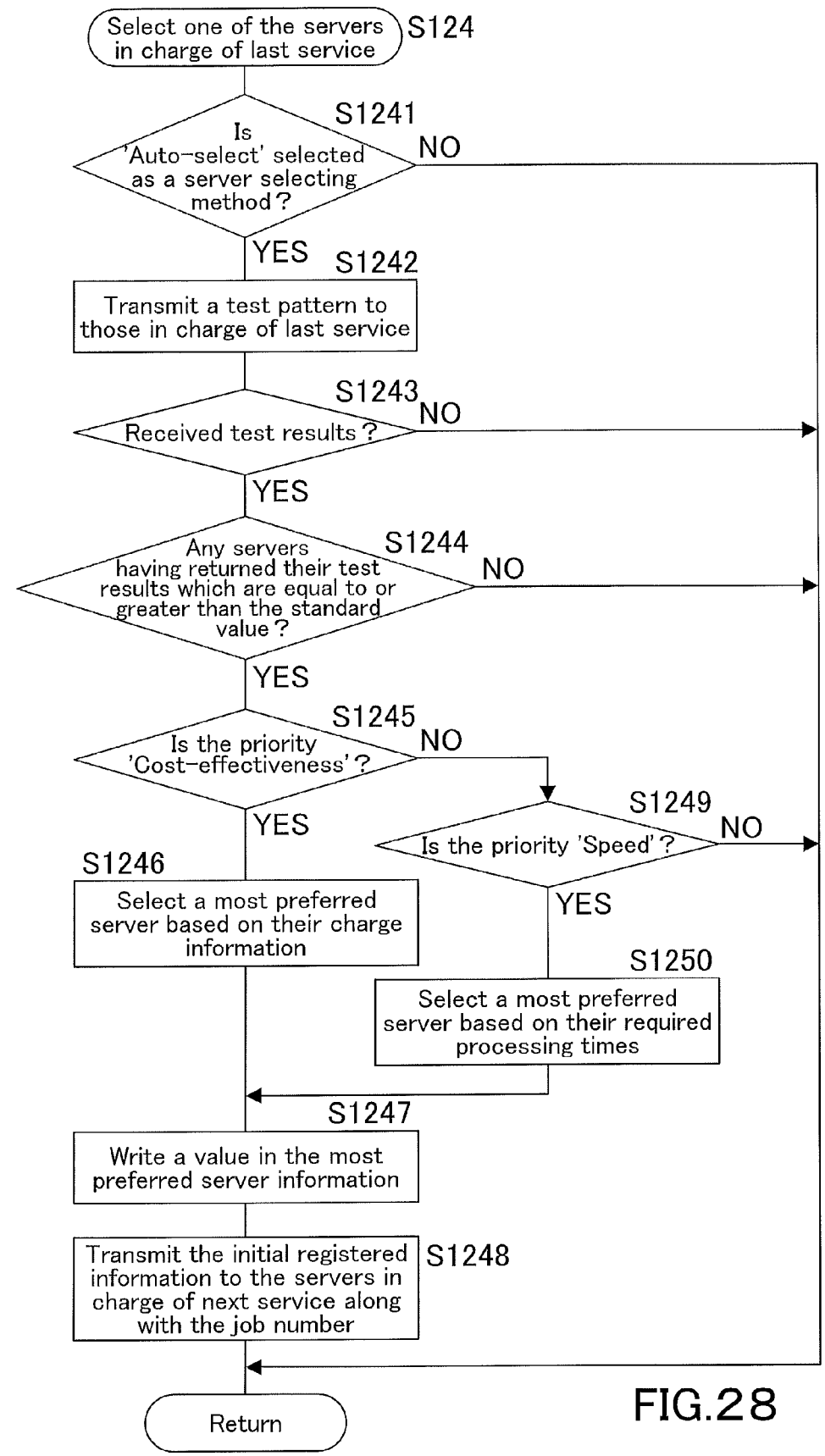
FIG. 28 is a flowchart representing a sub processing routine corresponding to a server selection operation (Step S124) in FIG. 27 which is to select a server in charge of the last service.

FIG. 28 is a flowchart representing a sub processing routine corresponding to the server selection operation (Step S124) in FIG. 27. In this operation, the image processing servers 21a-21c, 22a-22c, 23a-23c individually select one of the image processing servers in charge of the last image processing service, as the most preferred server.

In Step S1241, it is judged whether or not 'Auto Select' is selected as a server selecting method. If it is not 'Auto Select' (NO in Step S1241), the sub processing routine returns to the original sub processing routine.

If it is 'Auto Select' (YES in Step S1241), the sub processing routine proceeds to Step S1242, in which a test pattern is transmitted to the image processing servers in charge of the last image processing service.

In Step S1243, it is judged whether or not the results (test results) of performing image processing on the test pattern have been returned from all of them. If they are not returned yet (NO in Step S1243), the sub processing routine returns to the main processing routine. If they are returned (YES in Step S1243), then it is judged in Step S1244 whether or not there are any servers having returned the test results which are judged as being equal to or higher than the standard value.

If there are no servers having returned the test results which are judged as being equal to or higher than the standard value (NO in Step S1244), the sub processing routine returns to the main processing routine. If there are any servers having returned the test results which are judged as being equal to or higher than the standard value (YES in Step S1244), the sub processing routine proceeds to Step S1245.

In Step S1245, it is judged whether or not 'Cost-effectiveness' is selected as a selection criterion. If it is 'Cost-effectiveness' (YES in Step S1245), by examining the charge information obtained from the image processing servers in charge of the last image processing service, a server ensuring the lowest charge is selected as the most preferred server among the servers having returned a value equal to or greater than the standard value, in Step S1246. After that, the sub processing routine proceeds to Step S1247.

In Step S1245, if it is not 'Cost-effectiveness', the sub processing routine proceeds to Step S1249, in which it is judged whether or not 'Speed' is selected as a selection criterion. If it is 'Speed' (YES in Step S1249), by examining the required processing times obtained from those in charge of the last image processing service, a server ensuring the shortest processing time is selected as the most preferred server in Step S5259. After that, the sub processing routine proceeds to Step S1247.

If it is not 'Speed' (NO in Step S1249), the sub processing routine returns to the original sub processing routine.

If 'Speed' is selected as a selection criterion, the image processing server selected as the most preferred server performs its own image processing service again so as to provide its charge information.

In Step S1247, the most preferred server and its charge information are written in the most preferred server information. Subsequently, in Step S1248, the most preferred server information, the selection criteria information, and the service information, which are collectively referred to as 'initial registered information', are transmitted to those in charge of the next image processing service along with the job ID. After that, the sub processing routine returns to the original sub processing routine. In the case where the present image processing server corresponds to any of the image processing servers 23a-23c, the initial registered information is transmitted to the image forming apparatus 1.

Figure 29:
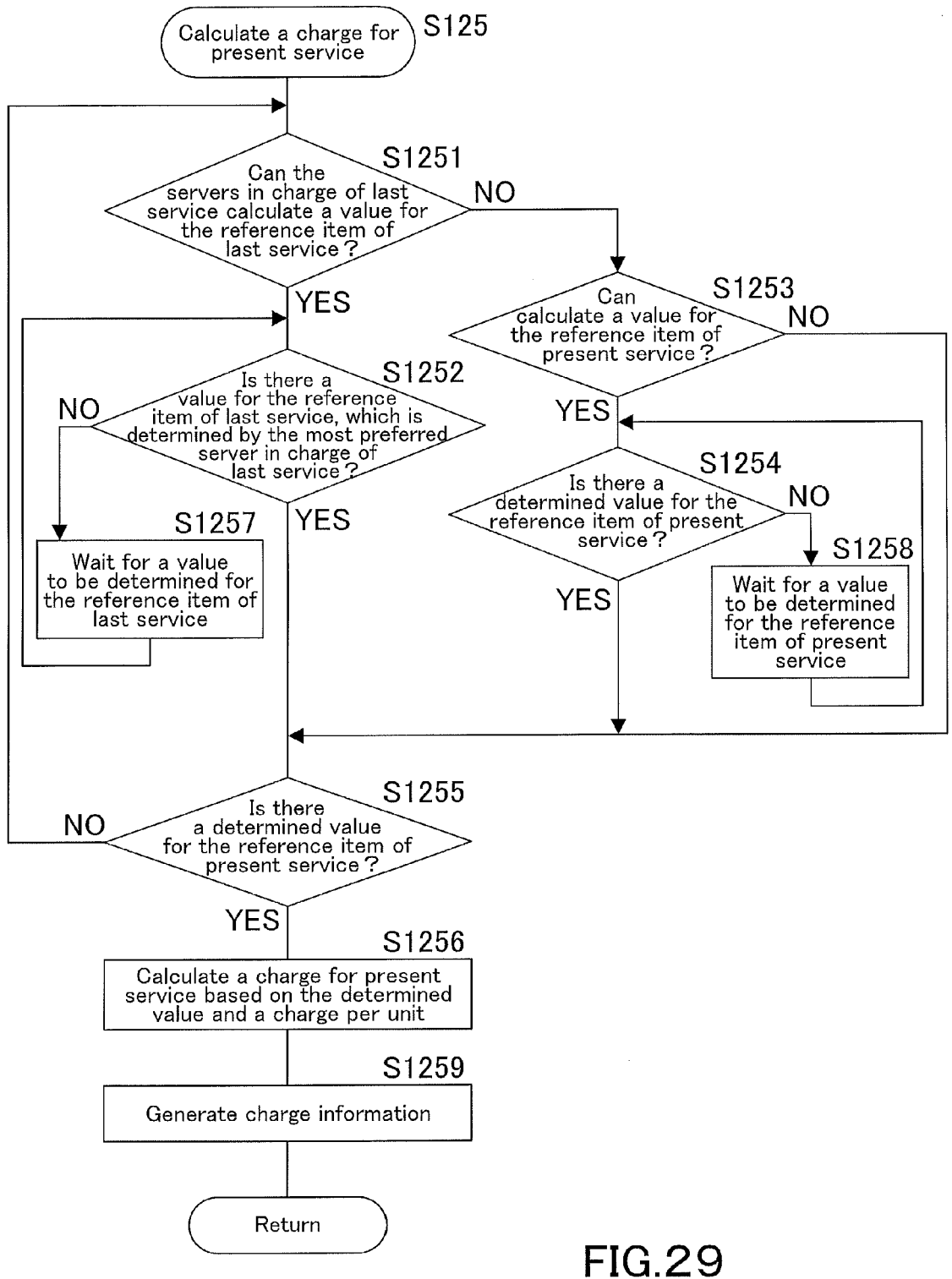
FIG. 29 is a flowchart representing a sub processing routine corresponding to a charge estimation operation (Step S125) in FIG. 27, which is to calculate a charge for the service of the image processing server.

FIG. 29 is a flowchart representing a sub processing routine corresponding to the charge estimation operation (Step S125) in FIG. 27. In this operation, the image processing servers 21a-21c, 22a-22c, 23a-23c individually estimate the charges for their responsible image processing services to generate charge information.

In Step S1251, it is judged whether or not the present image processing server can estimate reference values for the reference items of those in charge of the last image processing service. If it can (YES in Step S1251), then it is judged whether or not there is a determined reference value for the reference item in the estimation reference information from the most preferred server in charge of the last image processing service.

If there is such a reference value already (YES in Step S1252), the sub processing routine proceeds to Step S1255. If there is not such a reference value (YES in Step S1252), the sub processing routine waits until it is determined by the most preferred server in charge of the last image processing service, and then returns to Step S1252.

In Step S1251, if the present image processing server cannot estimate reference values for the reference items of those in charge of the last image processing service (NO in Step S1251), the sub processing routine proceeds to Step S1253.

In Step S1253, it is judged whether or not the present image processing server can estimate a reference value for its own reference item. If it can (YES in Step S1253), then it is judged in Step S1254 whether or not there is a determined reference value for its own reference item in the estimation reference information.

If there is such a reference value already (YES in Step S1254), the sub processing routine proceeds to Step S1255. If there is not such a reference value yet (YES in Step S1252), the sub processing routine waits until it is determined by the present image processing server in Step S1258, and then returns to Step S1254.

In this mode of implementation, the present image processing server writes a reference value for its own reference item in the estimation reference information during the image processing operation of Step S13 as to be further described below. Alternatively, if judging that there is not a determined reference value for its own reference item in the estimation reference information, the present image processing server may immediately return to Step S13 of the main processing routine then start this sub processing routine all over again with a determined reference value for its own reference item in Step S13.

In Step S1253, if the present image processing server cannot estimate a reference value for its own reference item (NO in Step S1253), the sub processing routine proceeds to Step S1255.

In Step S1255, it is judged whether or not there is a determined reference value for its own reference item based on which to estimate the charge, in the estimation reference information. If there is not such a reference value (NO in Step S1255), the sub processing routine returns to Step S1251. If there is such a reference value already (YES in Step S1255), the present image processing server estimates the charge based on the determined reference value and the charge per unit in Step S1256, and generates charge information indicating the estimated amount in Step S1259. And then, the sub processing routine returns to the original sub processing routine.

Figure 30:
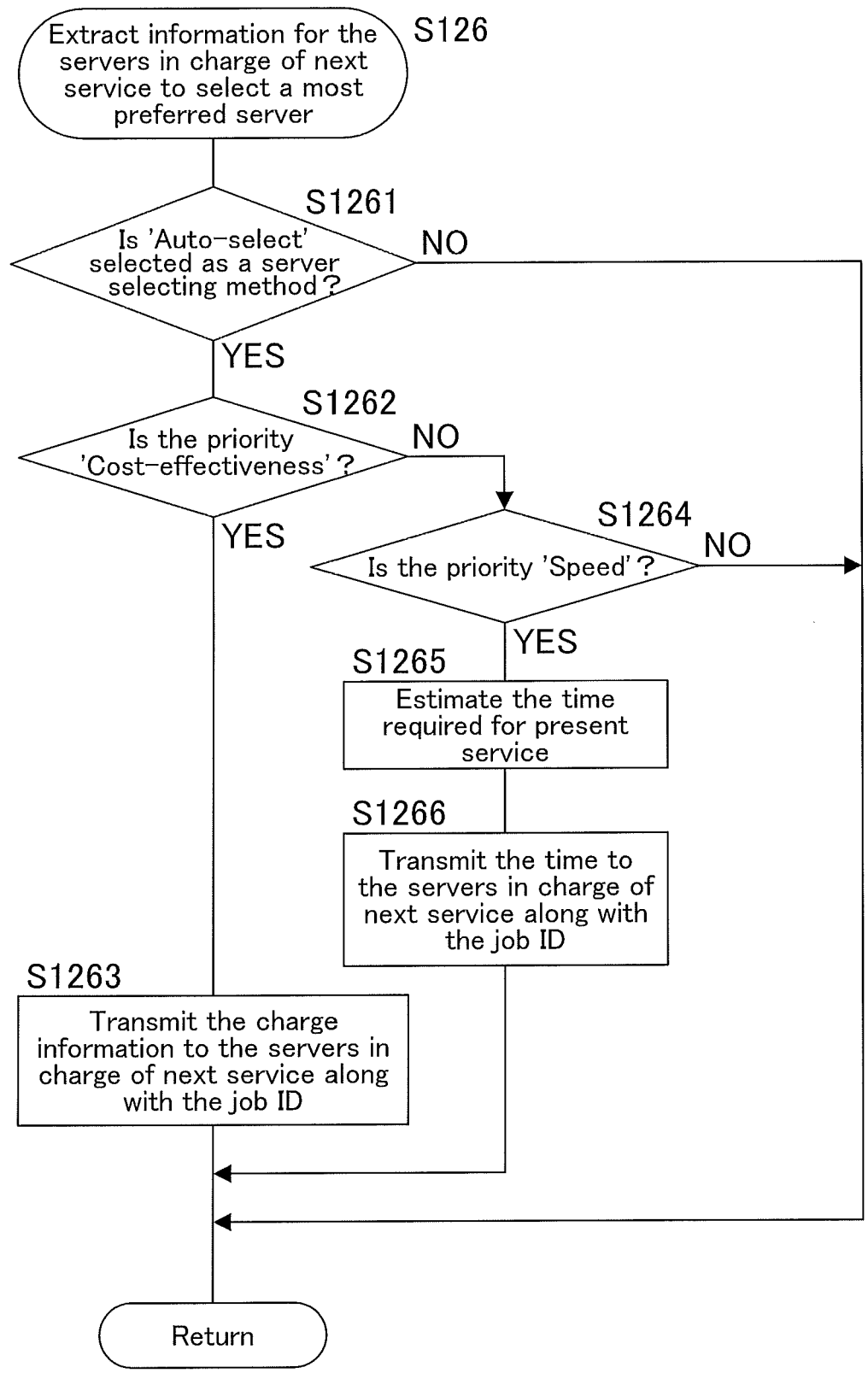
FIG. 30 is a flowchart representing a sub processing routine corresponding to an information extraction operation (Step S126) in FIG. 27, which is to extract information to select a server in charge of the next service.

FIG. 30 is a flowchart representing a sub processing routine corresponding to an operation to extract information for those in charge of the next image processing service to select the most preferred server (Step S126). In this operation, the image processing servers 21a-21c, 22a-22c, 23a-23c individually transfer the charge information generated in Step S1259 of FIG. 29, to those in charge of the next image processing service; and further transfer the required processing times to those in charge of the next image processing server if 'Speed' is selected as a selection criteria.

In Step S1261, it is judged whether or not 'Auto Select' is selected as a server selecting method. If it is not 'Auto Select' (NO in Step S1261), the sub processing routine returns to the original sub processing routine.

If it is 'Auto Select' (YES in Step S1261), the sub processing routine proceeds to Step S1262, in which it is judged whether or not 'Cost-effectiveness' is selected as a selection criterion. If it is 'Cost-effectiveness' (YES in Step S1262), the charge information is transmitted to those in charge of the next image processing service along with the job ID in Step S1263. After that, the sub processing routine returns to the original sub processing routine.

In Step S1262, if it is not 'Cost-effectiveness', the sub processing routine proceeds to Step S1264, in which it is judged whether or not 'Speed' is selected as a selection criterion. If it is 'Speed' (YES in Step S1264), the present image processing server estimates the time required for its responsible image processing service in Step S1265, and transmits information indicating the estimated time to those in charge of the next image processing service along with the job ID in Step S1266. After that, the sub processing routine returns to the original sub processing routine. And then if any of those in charge of the next image processing servers selects the present image processing server as the most preferred server, the present image processing server will receive a notice of that. When receiving such a notice, the present image processing server performs its responsible image processing service on the document image and transmits charge information to those in charge of the next image processing service.

If it is not 'Speed' (NO in Step S1264), the sub processing routine returns to the original sub processing routine.

In the case where the present image processing server corresponds to any of the image processing servers 23a-23c in Steps S1263 and S1266, those information objects are transmitted to the image forming apparatus 1.

Figure 31:
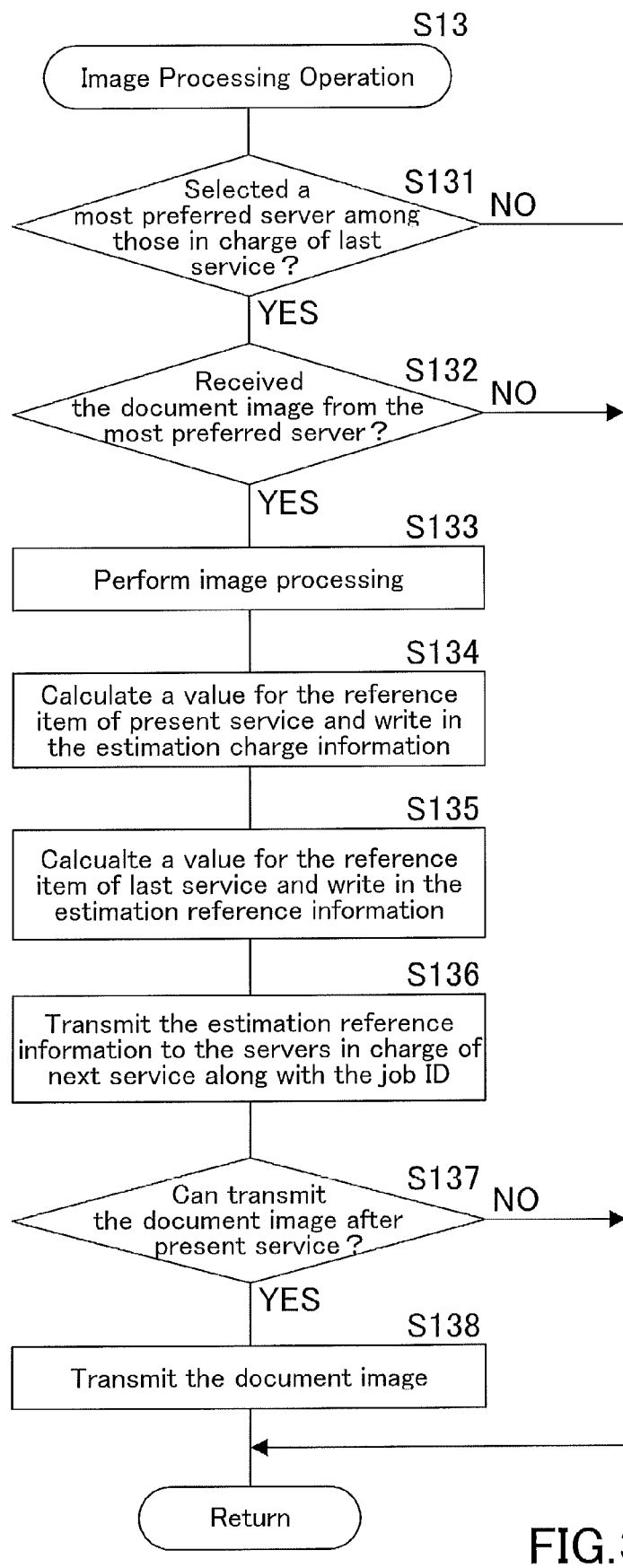
FIG. 31 is a flowchart representing a sub processing routine corresponding to an image processing operation (Step S13) in FIG. 26.

FIG. 31 is a flowchart representing a sub processing routine corresponding to the image processing operation (Step S13) in FIG. 26. In this operation, the image processing server 21a-21c, 22a-22c, 23a-23c individually perform their responsible image processing services, estimate reference values for their own reference items based on which those in charge of the next image processing service estimate their charges, and writes the estimated amounts in the estimation reference information.

In Step S131, it is judged whether or not the most preferred server has been selected among those in charge of the last image processing service. If it has not been selected (NO in Step S131), the sub processing routine returns to the main processing routine. If it has been selected (YES in Step S131), then it is judged in Step S132 whether or not the document image has been received. If it is not received yet (NO in Step S132), the sub processing routine returns to the main processing routine. If it is received (YES in Step S132), the present image processing server performs its responsible image processing service on the document image.

Subsequently in Step S134, the present image processing server estimates a reference value for its own reference item and writes the estimated amount in the charge information. And in Step S135, the present image processing server estimates a reference value for the reference item based on which those in charge of the next image processing service estimate their charges, and writes the estimated amount in the estimation reference information.

And then in Step S136, the estimation reference information is transmitted to those in charge of the next image processing service along with the job ID. In the case where the present image processing server corresponds to any of those in charge of the final image processing service, there is no need to transmit the estimation reference information to the image forming apparatus 1.

In Step S137, it is judged whether or not the document image obtained by the image processing operation can be transferred to the next address. If it cannot be transferred (NO in Step S137), the sub processing routine returns to the main processing routine. If the document image can be transferred (YES in Step S137), it is transferred to those in charge of the next image processing service in Step S128, and then the sub processing routine returns to the main processing routine. In the case where the present image processing server corresponds to any of those in charge of the final image processing service, the document image is transferred to the image forming apparatus 1.

Some modes of implementing the present invention have been described in the foregoing specification, which does not mean that the present invention shall be construed as limited to the particular forms disclosed.

For example, in this mode of implementation described above, the image processing servers individually select one of those in charge of the last image processing service as the most preferred server, while performing their image processing service. Alternatively, the image processing servers individually may perform a pre-operation, instead of an image processing operation, to estimate their charges only to select all most preferred servers, and then start to cooperatively and orderly perform sequential image processing services by transferring the document image to the most preferred servers previously selected.

Figure 32:
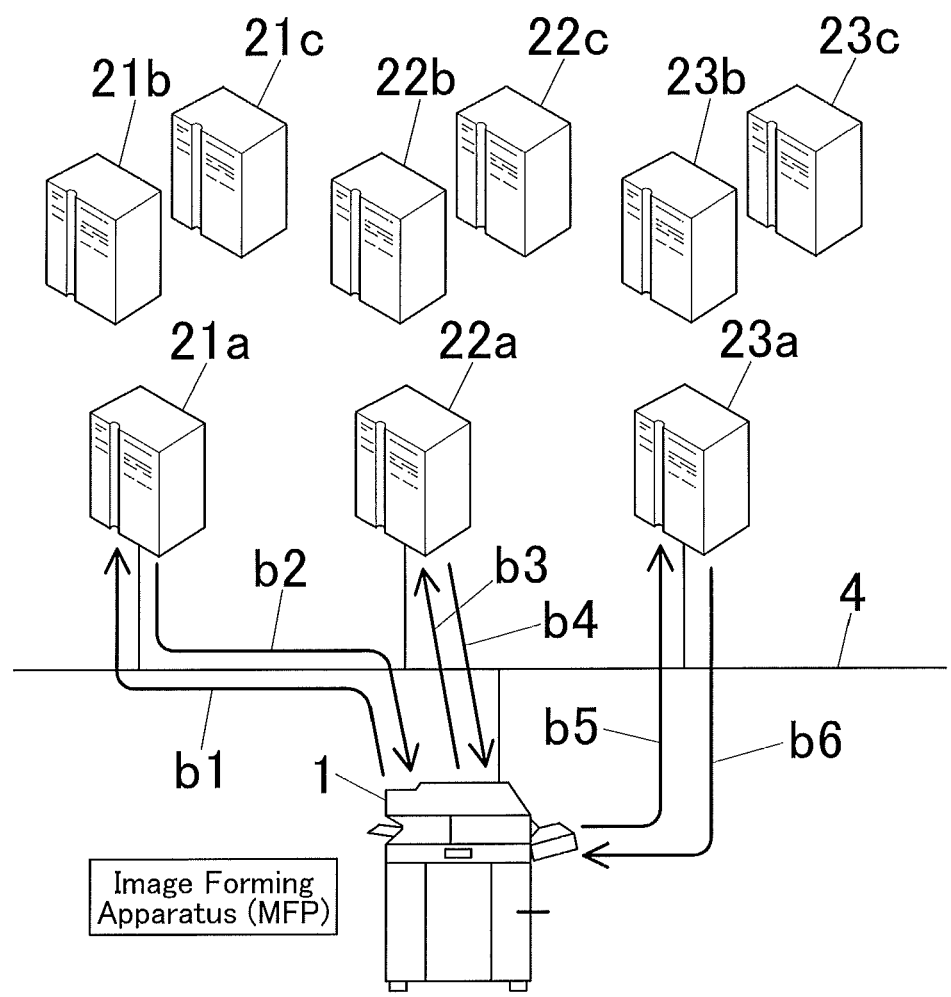
FIG. 32 is a view to explain an image processing system in which the image forming apparatus exchanges image data and other information with each of the image processing servers in a direct manner.

Furthermore, in this mode of implementation, the image forming apparatus 1 transmit service information indicating the order of the sequential image processing services to the image processing servers 21a-21c, 22a-22c, 23a-23c. The image processing servers 21a-21c, 22a-22c, 23a-23c transmit a document image, estimation reference information, most preferred server information, and the like to the next address according to the order indicated by the service information; transmit a test pattern to those in charge of the last image processing service; collect the test results from all those in charge of the last image processing service; and select a most preferred server among those in charge of the last image processing service. Alternatively, the image forming apparatus 1 may transmit service information, a test pattern, and the like to the image processing servers 21a-21c, 22a-22c, 23a-23c as indicated by Arrows b1, b3, and b5 in FIG. 32; collect the test results and charge information from all of them as indicated by Arrows b2, b4, and b6; and select a most preferred server for each of the sequential image processing services.

Figure 33:
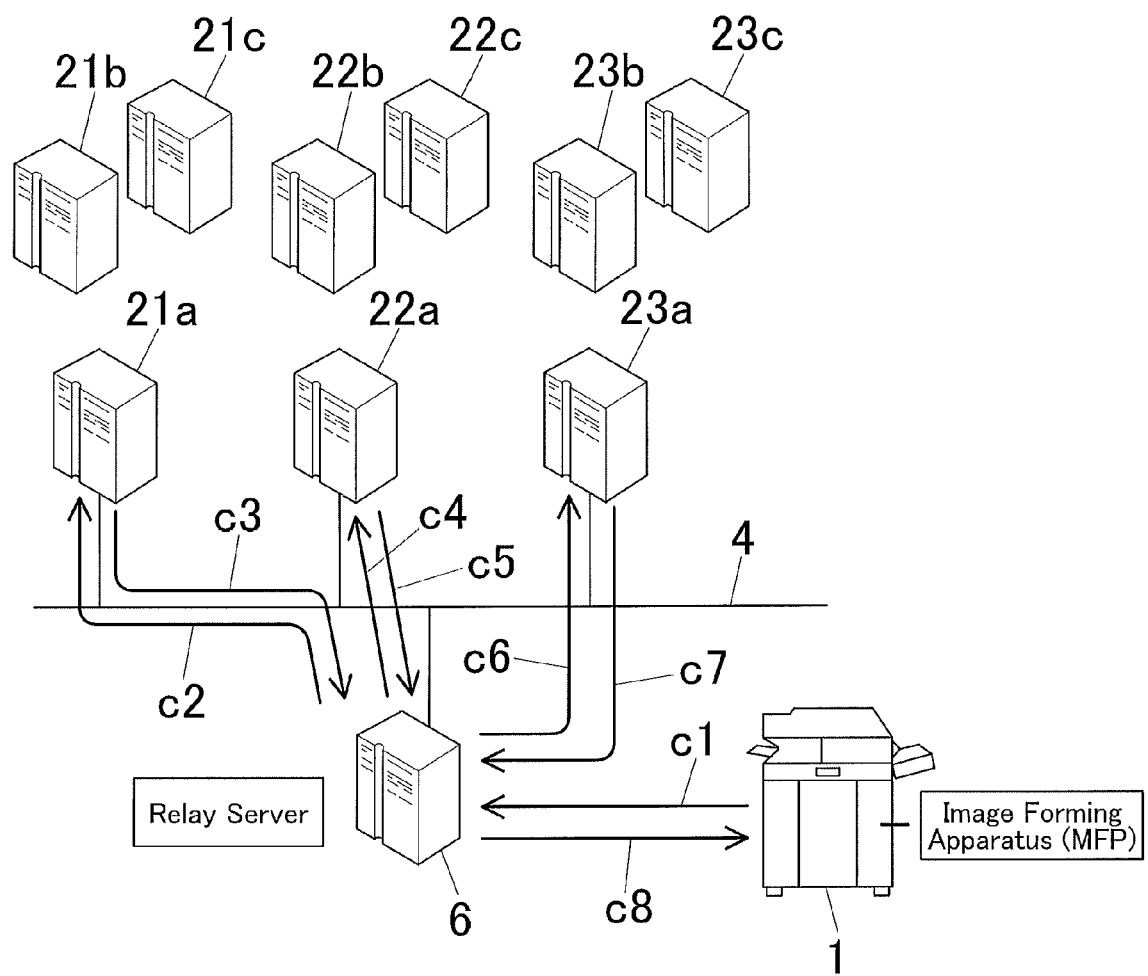
FIG. 33 is a view to explain an image processing system in which a relay server relays communication between the image forming apparatus and each of the image processing servers in order to control the image processing servers.

Alternatively, according to another mode of implementation as illustrated in FIG. 33, a relay server 6 for controlling the image processing servers 21a-21c, 22a-22c, 23a-23c may be further connected to the network between the image forming apparatus 1 and the section of the image processing servers 21a-21c, 22a-22c, 23a-23c. In this mode of implementation, the image forming apparatus 1 transmits a document image and the like to the relay server 6 (as indicated by Arrow c1 in FIG. 33). After that, the relay server 6 exchange the document image, estimation reference information, a test pattern, and the like with the image processing servers 21a-21c, 22a-22c, 23a-23c as indicated by Arrows c2, c3, c4, c5, c6, and c7. After the final image processing service, the relay server 6 returns the obtained document image to the image forming apparatus 1 (as indicated by Arrow c8).

The present invention having been described above may be applied to the following modes.

[1] An image processing system comprising:
   an image forming apparatus being configured to output a target image; and
   a plurality of image processing servers being connected to the image forming apparatus via a network and configured to perform one of sequential image processing operations on the target image outputted from the image forming apparatus, wherein there are a plurality of the plurality of image processing servers, being configured to cooperatively and orderly perform the sequential image processing operations on the target image outputted from the image forming apparatus,
   the image processing server comprising:
   a test image transmitter which transmits a test image to all the image processing servers in charge of a former image processing operation;
   an image processor which performs a current image processing operation on a test image;
   a test results obtainer which obtains the results of the former image processing operation performed on the test image, from all those in charge of the former image processing operation;
   a judgment portion which judges whether or not the results of the former image processing operation are equal to or higher than a standard value;
   a server selector which selects a most preferred server among the image processing servers only having returned the results which are judged as being equal to or higher than the standard value; and a notice transmitter which transmits a notice of the most preferred server selected by the server selector, to all those in charge of a next image processing operation or the image forming apparatus, the image forming apparatus comprising:

a test image storage which stores a test image;

a test image transmitter which transmits the test image stored on the test image storage, to all the image processing servers in charge of a final image processing operation;

a test results obtainer which obtains the results of the final image processing operation performed on the test image, from all those in charge of the final image processing operation;

a judgment portion which judges whether or not the results of the final image processing operation are equal to or higher than a standard value; and a server selector which selects a most preferred server among the image processing servers only having returned the results of the final image processing operation which are judged as being equal to or higher than the standard value.

[2] The image processing system as recited in the aforementioned item [1], wherein:

each of the image processing servers further comprises a test image storage which stores the test image; and the test image transmitter transmits the test image stored on the test image storage, to all those in charge of the former image processing operation.

[3] The image processing system as recited in the aforementioned item [1], wherein:

each of the image processing servers further comprises a test image obtainer which obtains the test image stored on the test image storage of the image forming apparatus; and the test image transmitter transmits the test image obtained by the test image obtainer, to all those in charge of the former image processing operation.

[4] The image processing system as recited in the aforementioned item [3], wherein:

the test image obtainer further obtains a reference image having been subjected to an image processing operation, along with the test image stored on the test image storage of the image forming apparatus; and the judgment portion further judges whether or not the results of the former image processing operation obtained by the test results obtainer are equal to or higher than a standard value indicated by the reference image obtained by the test image obtainer.

[5] An image processing system comprising:

an image forming apparatus being configured to output a target image; and a plurality of image processing servers being connected to the image forming apparatus via a network and configured to perform one of sequential image processing operations on the target image outputted from the image forming apparatus, wherein there are a plurality of the plurality of image processing servers, being configured to cooperatively and orderly perform the sequential image processing operations on the target image outputted from the image forming apparatus, the image processing servers each comprising:

an image processor which performs the image processing operation on a test image received from the image forming apparatus; and a test results transmitter which transmits the results of the image processing operation performed on the test image by the image processor, to the image forming apparatus, the image forming apparatus comprising:

a test image storage which stores a test image;

a test image transmitter which transmits the test image stored on the test image storage, to all the image processing servers;

a test results obtainer which obtains the results of the image processing operation performed on the test image, from all the image processing servers;

a judgment portion which judges whether or not the results of the image processing operation are equal to or higher than a standard value; and a server selector which selects a most preferred server among the image processing servers only having returned the results which are judged as being equal to or higher than the standard value.

[6] The image processing system as recited in any of the aforementioned items [1] to [4], wherein:

the image forming apparatus further comprises a standard value provider which provides the standard value to compare to the results of the former image processing operation;

the standard value provided from the standard value provider is transmitted to those in charge of the former image processing operation, the current image processing operation, and the next image processing operation, in this order; and the judgment portion of the image processing server further judges whether or not the results of the former image processing operation obtained by the test results obtainer are equal to or higher than the standard value provided from the standard value provider.

[7] The image processing system as recited in any of the aforementioned items [1] to [5], wherein:

the image forming apparatus further comprises a standard value provider which provides the standard value to compare to the results of the former image processing operation; and the standard value provider provides a standard value for each job.

[8] The image processing system as recited in the aforementioned item [7], wherein the standard value provider provides a standard value based on operator settings.

[9] The image processing system as recited in the aforementioned item [7], wherein the standard value provider employs as a standard value, a value of the results of the former image processing operation.

[10] The image processing system as recited in any of the aforementioned items [1] to [9], wherein:

a relay server is further connected to the network between the image forming apparatus and the plurality of the plurality of image processing servers; and the relay server relays data communication between the image forming apparatus and the plurality of the plurality of image processing servers.

[11] An image processing server to be employed in the image processing system as recited in any of the aforementioned items [1] to [10].

[12] An image forming apparatus to be employed in the image processing system as recited in any of the aforementioned items [1] to [10].

According to the mode of implementation as recited in the aforementioned item [1], the image processing servers in charge of an image processing service individually perform image processing on a test image and transmit the test results to the image processing servers in charge of a next image processing service. Receiving the test results from those in charge of a former image processing service, the image processing servers in charge of a current image processing service individually judge whether or not the test results returned therefrom are equal to or higher than the standard value, and selects one of the severs having returned the test results which are judged as being equal to or higher than the standard value, as the most preferred server. The image processing servers in charge of a final image processing service individually transmit the results of performing image processing on the test image, to the image forming apparatus. Receiving the test results from those in charge of the final image processing service, the image forming apparatus judges whether or not the test results returned therefrom are equal to or higher than the standard value, and selects one of the servers having returned the test results which are judged as being equal to or higher than the standard value, as the most preferred server. The image processing system is allowed to select a most preferred server for each of the sequential image processing services. The test results having returned from all the most preferred servers selected by this system are equal to or higher than the standard value. The image processing system is therefore allowed to ensure the required level of the quality of each of the sequential image processing services.

According to the mode of implementation as recited in the aforementioned item [2], the image processing servers in charge of an image processing service individually transmit a test image stored on themselves to those in charge of a former image processing service, and those in charge of the former image processing service individually perform their responsible image processing service on the test image, respectively.

According to the mode of implementation as recited in the aforementioned item [3], the image processing servers in charge of an image processing service individually transmit a test image originated from the image forming apparatus to those in charge of a former image processing service, and those in charge of the former image processing service individually perform their responsible image processing service on the test image, respectively.

According to the mode of implementation as recited in the aforementioned item [4], as well as a test image, the image processing servers in charge of an image processing service individually obtain a reference image having been subjected to the image processing service, from the image forming apparatus. And the image processing servers in charge of an image processing service individually judge whether or not the test results obtained from those in charge of a former image processing service, respectively, are equal to or higher than the standard value indicated by the reference image obtained from the image forming apparatus.

According to the mode of implementation as recited in the aforementioned item [5], all the image processing servers individually perform their responsible image processing services on a test image obtained from the image forming apparatus and return the test results to the image forming apparatus. The image forming apparatus judges whether or not the test results returned therefrom are equal to or higher than the standard value, and selects one of the servers having returned the test results which are judged as being equal to or higher than the standard value, as the most preferred server, about each of the sequential image processing services. The image processing system is allowed to select a most preferred server for each of the sequential image processing services. The test results having returned from all the most preferred servers selected by this system are equal to or higher than the standard value. The image processing system is therefore allowed to ensure the required level of the quality of each of the sequential image processing services.

According to the mode of implementation as recited in the aforementioned item [6], all the image processing servers are allowed to use a standard value determined by the image forming apparatus. Therefore, the image processing servers do not need to keep a standard value on themselves any more.

According to the mode of implementation as recited in the aforementioned item [7], the image forming apparatus is allowed to determine a standard value for each job.

According to the mode of implementation as recited in the aforementioned item [8], the image forming apparatus is allowed to determine a standard value based on operator settings.

According to the mode of implementation as recited in the aforementioned item [9], the image forming apparatus is allowed to employ a standard value from the image processing servers.

According to the mode of implementation as recited in the aforementioned item [10], a relay server is allowed to exchange data between the image forming apparatus and the plurality of the plurality of image processing servers.

According to the mode of implementation as recited in the aforementioned item [11], a plurality of image processing servers are configured to perform one of sequential image processing operations on a target image received from an image forming apparatus, and there are a plurality of the plurality of image processing servers, configured to cooperatively and orderly perform the sequential image processing operations on the target image. The image processing server is preferably employed in an image processing system which is capable of proving a certain level of the quality of each of the image processing services.

According to the mode of implementation as recited in the aforementioned item [12], a plurality of image processing servers are configured to perform one of sequential image processing operations on a target image received from an image forming apparatus, and there are a plurality of the plurality of image processing servers, configured to cooperatively and orderly perform the sequential image processing operations on the target image. The image forming apparatus is preferably employed in an image processing system which is capable of proving a certain level of the quality of each of the image processing services.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing system comprising:
   an image forming apparatus being configured to output a target image; and
   a plurality of image processing servers being connected to the image forming apparatus via a network and configured to perform one of sequential image processing operations on the target image outputted from the image forming apparatus, wherein there are a plurality of the plurality of image processing servers, being configured to cooperatively and orderly perform the sequential image processing operations on the target image outputted from the image forming apparatus,
   the image processing server comprising:
   a test image transmitter which transmits a test image to all the image processing servers in charge of a former image processing operation;
   an image processor which performs a current image processing operation on a test image;
   a test results obtainer which obtains the results of the former image processing operation performed on the test image, from all those in charge of the former image processing operation;
   a judgment portion which judges whether or not the results of the former image processing operation are equal to or higher than a standard value;
   a server selector which selects a most preferred server among the image processing servers only having returned the results which are judged as being equal to or higher than the standard value; and
   a notice transmitter which transmits a notice of the most preferred server selected by the server selector, to all those in charge of a next image processing operation or the image forming apparatus,
   the image forming apparatus comprising:
   a test image storage which stores a test image;
   a test image transmitter which transmits the test image stored on the test image storage, to all the image processing servers in charge of a final image processing operation;
   a test results obtainer which obtains the results of the final image processing operation performed on the test image, from all those in charge of the final image processing operation;
   a judgment portion which judges whether or not the results of the final image processing operation are equal to or higher than a standard value; and
   a server selector which selects a most preferred server among the image processing servers only having returned the results of the final image processing operation which are equal to or higher than the standard value.

2. The image processing system as recited in claim 1, wherein:
   each of the image processing servers further comprises a test image storage which stores the test image; and
   the test image transmitter transmits the test image stored on the test image storage, to all those in charge of the former image processing operation.

3. The image processing system as recited in claim 1, wherein:
   each of the image processing servers further comprises a test image obtainer which obtains the test image stored on the test image storage of the image forming apparatus; and
   the test image transmitter transmits the test image obtained by the test image obtainer, to all those in charge of the former image processing operation.

4. The image processing system as recited in claim 3, wherein:
   the test image obtainer further obtains a reference image having been subjected to an image processing operation, along with the test image stored on the test image storage of the image forming apparatus; and
   the judgment portion further judges whether or not the results of the former image processing operation obtained by the test results obtainer are equal to or higher than a standard value indicated by the reference image obtained by the test image obtainer.

5. The image processing system as recited in claim 1, wherein:
   a relay server is further connected to the network between the image forming apparatus and the plurality of the plurality of image processing servers; and
   the relay server relays data communication between the image forming apparatus and the plurality of the plurality of image processing servers.

6. An image processing server to be employed in the image processing system as recited in claim 1.

7. An image forming apparatus to be employed in the image processing system as recited in claim 1.

8. An image processing system comprising:
   an image forming apparatus being configured to output a target image; and
   a plurality of image processing servers being connected to the image forming apparatus via a network and configured to perform one of sequential image processing operations on the target image outputted from the image forming apparatus,
   wherein there are a plurality of the plurality of image processing servers, being configured to cooperatively and orderly perform the sequential image processing operations on the target image outputted from the image forming apparatus,
   the image processing servers each comprising:
   an image processor which performs the image processing operation on a test image received from the image forming apparatus; and
   a test results transmitter which transmits the results of the image processing operation performed on the test image by the image processor, to the image forming apparatus,
   the image forming apparatus comprising:

a test image storage which stores a test image;

a test image transmitter which transmits the test image stored on the test image storage, to all the image processing servers;

a test results obtainer which obtains the results of the image processing operation performed on the test image, from all the image processing servers;

a judgment portion which judges whether or not the results of the image processing operation are equal to or higher than a standard value; and a server selector which selects a most preferred server among the image processing servers only having returned the results which are judged as being equal to or higher than the standard value.

9. The image processing system as recited in claim 1, wherein:

the image forming apparatus further comprises a standard value provider which provides the standard value to compare to the results of the former image processing operation;

the standard value provided from the standard value provider is transmitted to those in charge of the former image processing operation, the current image processing operation, and the next image processing operation, in this order; and the judgment portion of the image processing server further judges whether or not the results of the former image processing operation obtained by the test results obtainer are equal to or higher than the standard value provided from the standard value provider.

10. The image processing system as recited in claim 1, wherein:

the image forming apparatus further comprises a standard value provider which provides the standard value to compare to the results of the former image processing operation; and the standard value provider provides a standard value for each job.

11. The image processing system as recited in claim 10, wherein the standard value provider provides a standard value based on operator settings.

12. The image processing system as recited in claim 10, wherein the standard value provider employs as a standard value, a value of the results of the former image processing operation.

13. An image processing server to be employed in the image processing system as recited in claim 8.

14. An image forming apparatus to be employed in the image processing system as recited in claim 8.

* * * * *